(12) United States Patent
Li et al.

(10) Patent No.: US 12,168,509 B2
(45) Date of Patent: Dec. 17, 2024

(54) WING STRUCTURE FOR VEHICLE, AND VEHICLE

(71) Applicant: WESTLAKE UNIVERSITY, Zhejiang (CN)

(72) Inventors: Wei Li, Zhejiang (CN); Liping Zhang, Zhejiang (CN); Bing Luo, Zhejiang (CN); Zhenhua Wang, Zhejiang (CN); Weicheng Cui, Zhejiang (CN)

(73) Assignee: WESTLAKE UNIVERSITY, Zhejiang (CN)

( * ) Notice: Subject to any disclaimer, the term of this patent is extended or adjusted under 35 U.S.C. 154(b) by 0 days.

(21) Appl. No.: 18/013,558

(22) PCT Filed: Jul. 1, 2020

(86) PCT No.: PCT/CN2020/099723
§ 371 (c)(1),
(2) Date: Dec. 29, 2022

(87) PCT Pub. No.: WO2022/000367
PCT Pub. Date: Jan. 6, 2022

(65) Prior Publication Data
US 2023/0249801 A1 Aug. 10, 2023

(51) Int. Cl.
*B64C 3/48* (2006.01)
*B64C 3/18* (2006.01)
(Continued)

(52) U.S. Cl.
CPC .............. *B64C 3/48* (2013.01); *B64C 3/185* (2013.01); *B64C 3/187* (2013.01); *B64C 3/385* (2013.01); *B64C 3/40* (2013.01)

(58) Field of Classification Search
CPC ..... B64C 3/385; B64C 3/48; B64C 2003/445; B64C 3/38; B64C 33/00; B64C 33/02; B64C 33/025; B64U 10/40
See application file for complete search history.

(56) References Cited

U.S. PATENT DOCUMENTS 4,863,117 A * 9/1989 Riout ..................... F03D 1/065
244/22
7,699,270 B2 * 4/2010 Lonsinger ................ B64C 3/48
244/219
(Continued)

FOREIGN PATENT DOCUMENTS

CN 206537487 U 10/2017
CN 108622369 A * 10/2018 ............... B64C 3/48
(Continued)

*Primary Examiner* — Joseph W Sanderson
(74) *Attorney, Agent, or Firm* — Samson G. Yu

(57) ABSTRACT

A wing structure for a vehicle includes a plurality of multi-connecting-rod structures, the multi-connecting-rod structures are arranged along the main body of the vehicle, each of the multi-connecting-rod structure being arranged in a direction extending from a main body of the vehicle to a wingtip, each of the multi-connecting-rod structures comprising a plurality of connecting rods, and the connecting rods that are adjacent to each other being connected by a motor, a plurality of groups of ribs are sleeved onto each of the multi-connecting-rod structures, and each group of the ribs comprises a plurality of rib units, wherein in the same group of the ribs, adjacent rib units are connected by a ball hinge. The present technical solution can perform adjustment on a complex flow field or environment, the motion speed and the motion efficiency are significantly improved, and high maneuvering actions can be achieved.

10 Claims, 29 Drawing Sheets

(51) Int. Cl.
  *B64C 3/38*   (2006.01)
  *B64C 3/40*   (2006.01)

(56) References Cited

U.S. PATENT DOCUMENTS

| | | | | |
|---|---|---|---|---|
| 7,918,421 | B2 * | 4/2011 | Voglsinger | B64C 3/48 |
| | | | | 244/219 |
| 7,931,240 | B2 * | 4/2011 | Kothera | B63B 1/248 |
| | | | | 244/99.2 |
| 8,991,769 | B2 * | 3/2015 | Gandhi | B64C 3/546 |
| | | | | 244/129.1 |
| 9,856,012 | B2 * | 1/2018 | Xi | B64C 3/44 |
| 11,519,275 | B1 * | 12/2022 | Neely | F01D 5/141 |
| 2006/0145029 | A1 * | 7/2006 | Lonsinger | B64C 3/52 |
| | | | | 244/219 |
| 2006/0157623 | A1 * | 7/2006 | Voglsinger | B64C 3/48 |
| | | | | 244/219 |
| 2007/0205322 | A1 * | 9/2007 | Liao | B64U 10/80 |
| | | | | 244/22 |
| 2007/0210207 | A1 * | 9/2007 | Liao | B64C 33/02 |
| | | | | 244/22 |
| 2008/0035788 | A1 * | 2/2008 | Kothera | B64C 27/615 |
| | | | | 244/99.8 |
| 2015/0047337 | A1 * | 2/2015 | Gandhi | B64C 3/36 |
| | | | | 60/527 |
| 2015/0151830 | A1 * | 6/2015 | Xi | B64C 3/44 |
| | | | | 244/46 |

FOREIGN PATENT DOCUMENTS

| | | | | |
|---|---|---|---|---|
| CN | 109703741 | A | 5/2019 | |
| CN | 209159998 | U | 7/2019 | |
| CN | 110254708 | A | 9/2019 | |
| CN | 209870739 | U | 12/2019 | |
| DE | 4125974 | A1 * | 2/1993 | B64C 33/00 |
| GB | 191019349 | A | 5/1911 | |
| KR | 101902698 | B1 * | 9/2015 | |

* cited by examiner

WING STRUCTURE FOR VEHICLE, AND VEHICLE

TECHNICAL FIELD

The present disclosure relates to the field of navigation devices, and more particularly, to a wing structure for a vehicle, and a vehicle.

BACKGROUND

Most of the vehicles in the prior art adopt a fixed-wing structure or a relatively limited morphing wing structure, which cannot be adjusted for the actual navigation or flight environment or complex flow field, resulting in low navigation or flight speed, inefficiency, poor stability, and incapability of high maneuverability.

SUMMARY

An object of the embodiments of the present disclosure is to provide a wing structure for a vehicle, and a vehicle, so as to solve the problems in the prior art that the navigation or flight speed is low, the efficiency is low, the stability is poor, and the high maneuvering action cannot be achieved.

In order to solve the above technical problems, the embodiments of the present disclosure adopt the following technical solutions: A wing structure for a vehicle, comprising at least one multi-connecting-rod structure, the multi-connecting-rod structure being arranged in a direction extending from a main body of the vehicle to a wingtip, each of the multi-connecting-rod mechanism comprising a plurality of connecting rods, and the connecting rods that are adjacent to each other being connected by means of a motor.

In some embodiments, the connecting rod and the motor are connected to each other to realize at least one of the following changes or movements of the wing structure: changes in an airfoil profile, changes in a pitch angle, twisting along a spanwise direction at a distal portion, swinging perpendicularly along a plane where the main body of the vehicle is located, and swinging longitudinally along the main body of the vehicle.

In some embodiments, the main body of the vehicle comprises a support connecting rod, the support connecting rod is consistent with a length direction of the main body of the vehicle, and a first end of the multi-connecting-rod structure is connected to the support connecting rod.

In some embodiments, a second end of the multi-connecting-rod structure is connected to an end rib.

In some embodiments, the multi-connecting-rod structures are sequentially arranged along the main body of the vehicle when the number of the multi-connecting-rod structures is plural.

In some embodiments, the lengths of the multi-connecting-rod structures arranged in sequence from a head to a tail of the main body of the vehicle decrease in sequence In some embodiments, a plurality of groups of ribs are sleeved onto the multi-connecting-rod structure, and each group of the ribs comprises at least one rib unit.

In some embodiments, the number of the rib units in each group of the ribs is less than or equal to the number of the multi-connecting-rod structure.

In some embodiments, in the same group of the ribs, adjacent rib units are connected by means of a ball hinge.

In some embodiments, front ends or rear ends of all the rib units sleeved on the same multi-connecting-rod structure are connected by a fixing part.

In some embodiments, the fixing part is an elastic fiber wire or a metal wire.

In some embodiments, a conical hole or a chute is arranged on the rib unit.

An embodiment of the present disclosure also provides a vehicle, which adopts the wing structure described in any one of the above technical solutions.

Embodiments of the present disclosure provide a wing structure having the feature of a morphing wing having a large range in both chordwise and spanwise directions. The wing structure has the capability of changing airfoil and changing a pitch angle within a large range, the capability of twisting along a spanwise direction at a distal portion, the capability of swinging perpendicularly within a large range along the plane in which the main body of the vehicle is located, and the capability of swinging longitudinally within a large range along the main body of the vehicle, adjustment can be performed on a complex flow field or environment, the motion speed and the motion efficiency are significantly improved, and high maneuvering actions can be achieved.

REFERENCE NUMERALS

Figure 1:
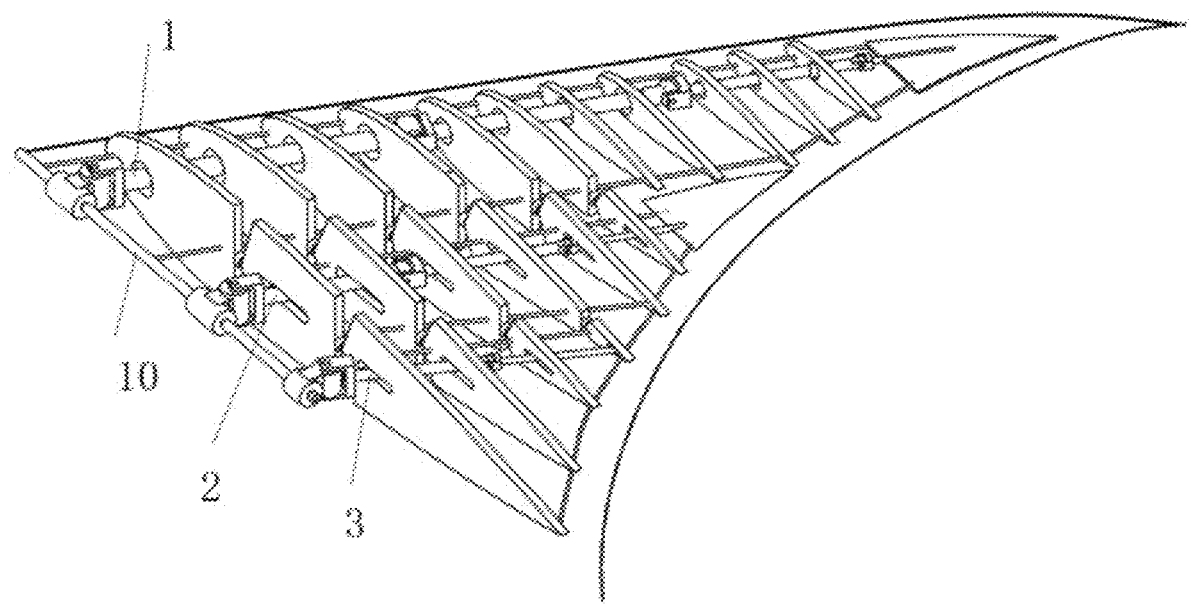
FIG. 1 is a schematic structural diagram of a wing structure with three multi-connecting-rod structures according to an embodiment of the disclosure.

1—leading multi-connecting-rod structure; 2—middle multi-connecting-rod structure; 3—trailing multi-connecting-rod structure; 8—leading end rib; 9—middle end rib; 10—support connecting rod;

101—first leading connecting rod; 102—second leading connecting rod; 103—third leading connecting rod; 104—fourth leading connecting rod; 105—fifth leading connecting rod; 106—first leading connector; 107—second leading connector; 108—third leading connector; 109—fourth leading connector; 111—first leading motor; 1111—first leading motor rotor; 1112—first leading motor stator; 112—second leading motor; 1121—second leading motor stator; 1122—second leading motor rotor; 113—third leading motor; 1131—third leading motor stator; 1132—third leading motor rotor; 114—fourth leading motor; 1141—fourth leading motor stator; 1142—fourth leading motor rotor; 115—fifth leading motor; 1151—fifth leading motor stator; 1152—fifth leading motor rotor; 116—sixth leading motor; 1161—sixth leading motor rotor; 1162—sixth leading motor stator; 117—seventh leading motor; 1171—seventh leading motor stator; 1172—seventh leading motor rotor; 118—fifth leading connector; 119—sixth leading connector; 120—seventh leading connector;

201—first middle connecting rod; 202—second middle connecting rod; 203—third middle connecting rod; 204—first middle connector; 205—second middle connector; 206—third middle connector; 207—Fourth middle connector; 208—fifth middle connector; 209—sixth middle connector; 211—first middle motor; 2111—first middle motor rotor; 2112—first middle motor stator; 212—second middle motor; 2121—second middle motor stator; 2122—second middle motor rotor; 213—third middle motor; 2131—third middle motor stator; 2132—third middle motor rotor; 214—fourth middle motor; 2141—four middle motor stator; 2142—fourth middle motor rotor;

301—first trailing connecting rod; 302—second trailing connecting rod; 303—first trailing connector; 304—second trailing connector; 305—third trailing connector; 306—fourth trailing connector; 311—first trailing motor; 3111—first trailing motor rotor; 3112—first trailing motor stator; 312—second trailing motor; 3121—second trailing motor stator; 3122—second trailing motor rotor; 313—third trailing motor; 3131—third trailing motor stator; 3132—third trailing motor rotor.

DETAILED DESCRIPTION

Various aspects and features of the present disclosure are described herein with reference to the accompanying drawings.

It should be understood that various modifications may be made to the embodiments claimed herein. Therefore, the above description should not be regarded as limiting, but merely as exemplifications of embodiments. Those skilled in the art will envision other modifications within the scope and spirit of this disclosure.

The accompanying drawings, which are incorporated in and constitute a part of this specification, illustrate embodiments of the present disclosure and, together with the general description of the disclosure given above and the detailed description of the embodiments given below, serve to explain the principles of the disclosure.

These and other features of the present disclosure will become apparent from the following description of preferred forms of embodiment, given as non-limiting examples, with reference to the accompanying drawings.

It is also to be understood that although the present disclosure has been described with reference to some specific examples, those skilled in the art will be able to realize many other equivalents of the present disclosure with certainty, which have the features as claimed in the claims and therefore fall within the scope of protection limited thereby.

The above and other aspects, features and advantages of the present disclosure will become more apparent in view of the following detailed description when taken in conjunction with the accompanying drawings.

Specific embodiments of the present disclosure are hereinafter described with reference to the accompanying drawings; however, it is to be understood that the claimed embodiments are merely examples of the disclosure, which may be embodied in various ways. Well-known and/or repeated functions and constructions have not been described in detail to avoid obscuring the present disclosure with unnecessary or redundant detail. Therefore, specific structural and functional details claimed herein are not intended to be limiting, but merely serve as a basis for the claims and a representative basis for teaching one skilled in the art to variously employ the present disclosure in any substantially suitable detailed structure.

The phrases "in one embodiment," "in another embodiment," "in yet another embodiment," or "in other embodiments" may be used in the specification, which may all refer to one or more of the same or different embodiments in accordance with the present disclosure.

The embodiments of the present disclosure relate to a wing structure applicable for a vehicle. Here, the vehicle can achieve sailing or flying, gliding and high maneuvering actions based on movements such as swinging of the wing structure in the air or in the water. The structure of the vehicle herein can be similar bionic structures such as bionic birds and bionic fish, and can also be structures such as aircraft-type dual-wing vehicle, and the present disclosure does not limit the specific structure of the vehicle. The wing structure here can also be called "flapping wings", which are arranged at any position on the main body of the vehicle, for example at sides of the main body of the vehicle, either at single side or symmetrically at two sides of the main body of the vehicle. The present disclosure also does not limit the setting position of the wing structure.

In the embodiment of the present disclosure, the wing structure herein can have a wide range of variable pitch angles, so as to achieve the effects of up and down flapping and forward and backward swinging. The wing structure can achieve a large amount of twisting and curling in the spanwise direction. To this end, the wing structure can be realized by a multi-connecting-rod structure in combination with motor driving, and the twisting and curling of the wing structure can be realized by the cooperation of the multi-connecting-rod structure and the motor driving. According to the number of multi-connecting-rod structures used in the wing structure, different forms of wing structure can be realized, thereby realizing different swinging poses and amplitudes. The motor here can be an outer-rotor motor or an inner-rotor motor, and generally includes a stator and a rotor.

Ribs are sleeved onto the multi-connecting-rod structure to achieve a certain airfoil, and the airfoil changes in real time during movement. The overall wing structure is covered with a membrane material, which constitutes the flexible skin of the wing structure.

In the following first embodiment, the implementation of the wing structure through three multi-connecting-rod structures is described in detail.

Figure 2:
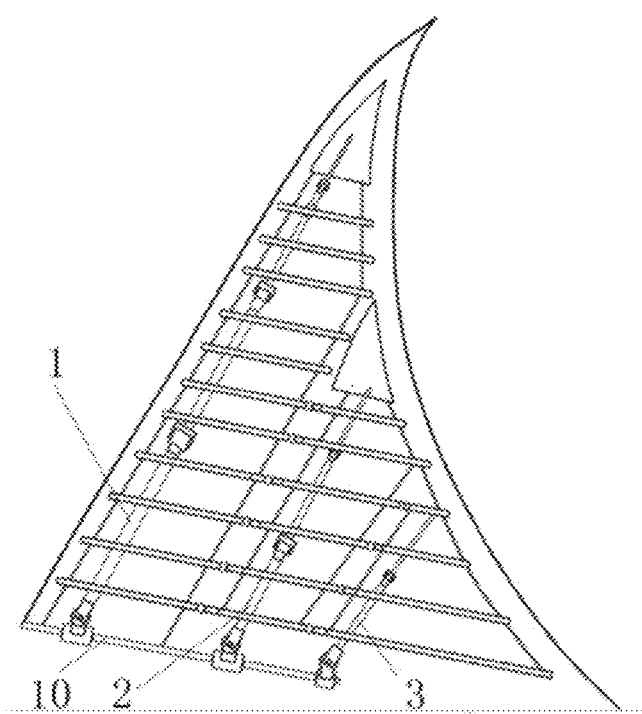
FIG. 2 is a schematic structural diagram of a wing structure with three multi-connecting-rod structures according to an embodiment of the present disclosure.

FIGS. 1 and 2 show a schematic structural diagram of a wing structure with three multi-connecting-rod structures. In this wing structure, three multi-connecting-rod structures are arranged in a direction extending from a main body of the vehicle to a wingtip at a leading edge, the middle and a trailing edge of the wing, respectively. The three multi-connecting-rod structures are respectively the leading multi-connecting-rod structure 1, the middle multi-connecting-rod structure 2 and the trailing multi-connecting-rod structure 3, which are arranged in sequence from the head to the tail of the main body of the vehicle, and whose total length decreases sequentially. First ends of these three multi-connecting-rod structures are all connected with a support connecting rod 10 located on the main body of the vehicle, where the support connecting rod 10 belongs to a part on a skeleton of the main body of the vehicle, and the direction of the support connecting rod 10 can be consistent with the length direction of the main body of the vehicle. The three multi-connecting-rod structures perform independent movements according to the control instructions, so as to better simulate the movement of the creature. Ribs is sleeved between the above-mentioned multi-connecting-rod mechanisms, and the ribs are composed of rib units. The rib unit can be made of rigid material. Preferably, the rib unit near the tail of the vehicle can be made of flexible material completely, or made of half rigid and half flexible material, so that the rib unit located near the tail of the vehicle has the ability to passively deform flexibly. The wing structure in the embodiment of the present disclosure has the characteristics of a widely variable wing in both the chordwise and spanwise directions, and has the capability of variable airfoil and wide range of pitch angle, the ability to twist in the spanwise direction at the distal portion of the wing structure away from the main body of the vehicle, the ability to swing in a large vertical range along the plane where the main body of the vehicle is located, and the ability to swing longitudinally within a wide range along the main body of the vehicle.

Figure 3:
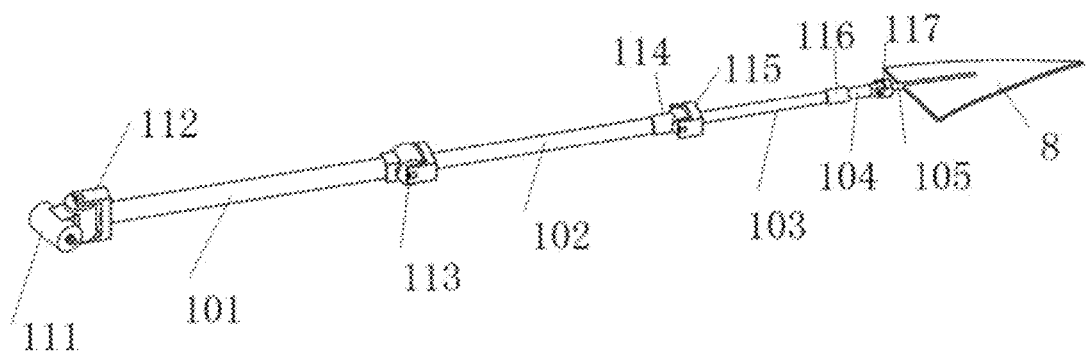
FIG. 3 is a schematic diagram of a leading multi-connecting-rod structure of a wing structure with three multi-connecting-rod structures according to an embodiment of the disclosure.

FIG. 3 shows the leading multi-connecting-rod structure 1 located at the leading edge of the wing, which includes a first leading connecting rod 101, a second leading connecting rod 102, a third leading connecting rod 103, a fourth leading connecting rod 104 and a fifth leading connecting rod 105 that are connected in sequence, in which the first leading connecting rod 101 is connected to the support connecting rod 10, and the fifth leading connecting rod 105 is connected to the leading end rib 8.

In order to enable the leading multi-connecting-rod structure 1 of the leading edge of the wing to swing with multiple degrees of freedom, the leading connecting rod and the support connecting rod the motor is connected by a motor, and the adjacent leading connecting rods are connected by a motor. To be more specific, the first leading connecting rod 101 and the support connecting rod 10 are connected by a first leading motor 111 and a second leading motor 112, and the first leading connecting rod 101 and the second leading connecting rod 102 are connected by a third leading motor 113. The second leading connecting rod 102 and the third leading connecting rod 103 are connected by the fourth leading motor 114 and the fifth leading motor 115, and the third leading connecting rod 103 and the fourth leading connecting rod 104 are connected by a sixth leading motor 116, and the fourth leading connecting rod 104 and the fifth leading connecting rod 105 are connected by a seventh leading motor 117. The first leading motor 111 and the sixth leading motor 116 are outer-rotor motors, the second leading motor 112, the third leading motor 113, the fourth leading motor 114, the fifth leading motor 115 and the seventh leading motor 117 are an inner-rotor motor.

It should be noted that, in the embodiment of the present disclosure, the number of the connecting rods and the arrangement of the motors between the connecting rods can be adjusted and set according to the actual situations, and are not limited to the arrangement in the embodiment.

Figure 4:
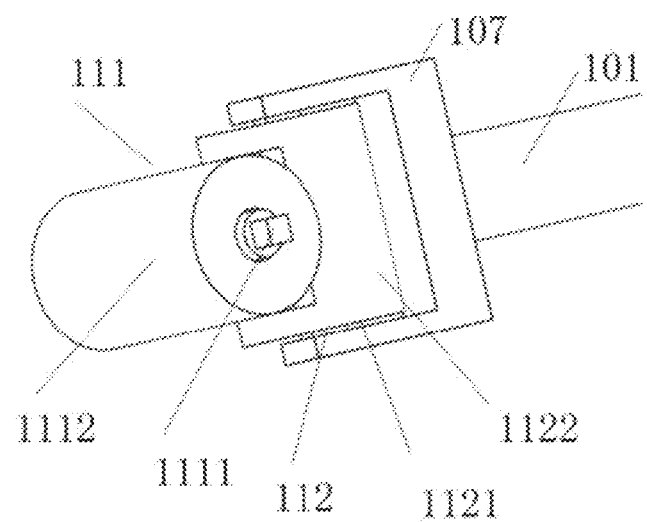
FIG. 4 is a schematic diagram of a leading multi-connecting-rod structure of a wing structure with three multi-connecting-rod structures according to an embodiment of the disclosure.
Figure 5:
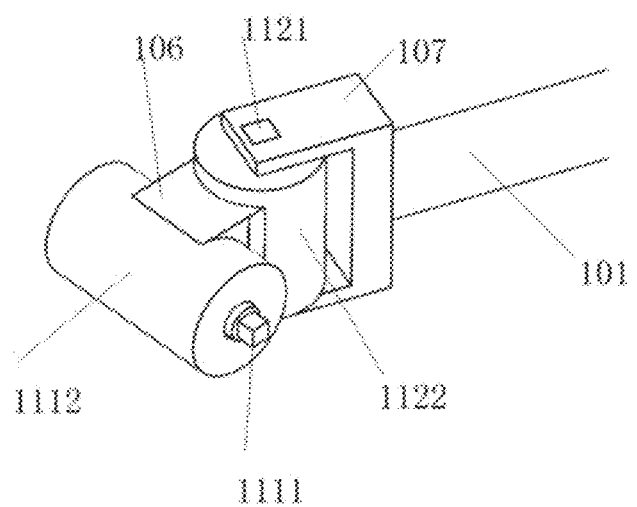
FIG. 5 is a schematic diagram of a leading multi-connecting-rod structure of a wing structure with three multi-connecting-rod structures according to an embodiment of the disclosure.

Further, as described above, the first leading connecting rod 101 and the support connecting rod 10 are connected by the first leading motor 111 and the second leading motor 112. The cooperation of first leading motor 111 and the second leading motor 112 can enable the wing structure to achieve the capability to swing vertically along the plane where the vehicle body is located, and also enable the wing structure to achieve the capability to swing longitudinally along the main body of the vehicle at the same time. Specifically, as shown in FIG. 4 and FIG. 5, the first leading motor 111 includes a first leading motor rotor 1111 and a first leading motor stator 1112, and the second leading motor 112 includes a second leading motor stator 1121 and a second leading motor rotor 1122. The first leading motor stator 1112 is located in the first leading motor rotor 1111, the second leading motor rotor 1122 is located in the second leading motor stator 1121, and the first leading motor stator 1112 is connected to the support connecting rod 10, so that the first leading motor stator 1112 and the supporting connecting rod 10 are coaxially arranged, and the first leading motor rotor 1111 is connected to the second leading motor stator 1121 by means of the first leading connector 106, so that the directions of the first leading motor stator 1112 and the second leading motor rotors 1122 are perpendicular to each other. Moreover, a second leading connector 107 is provided at a first end of the first leading connecting rod 101. The second leading motor stator 1121 is connected to the first leading connecting rod 101 by means of the second leading connector 107. For example, the first leading connector 106 and the second leading connector 107 may be U-shaped connectors, and the first leading motor rotor 1111 is fixedly arranged between two sides of the first leading connector 106. The bottom edge of the first leading connector 106 is connected to the side surface of the second leading motor stator 1121, and the second leading motor rotor 1122 is rotatably connected to the two sides of the second leading connector 107. The bottom edge of the second leading connector 107 is connected to the first end of the first leading connecting rod 101.

Figure 6:
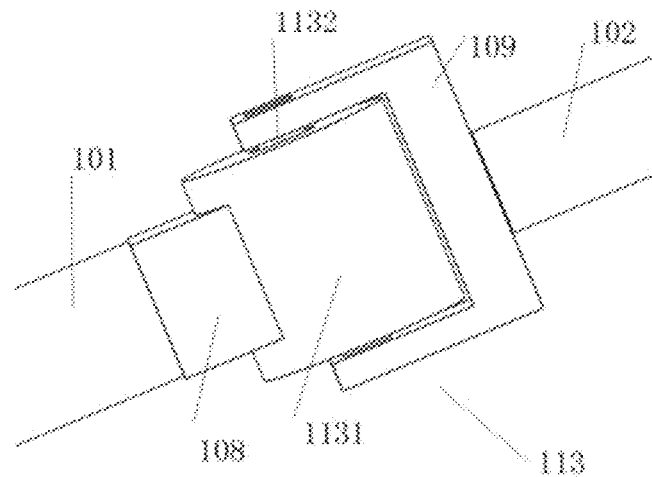
FIG. 6 is a schematic diagram of a leading multi-connecting-rod structure of a wing structure with three multi-connecting-rod structures according to an embodiment of the disclosure.
Figure 7:
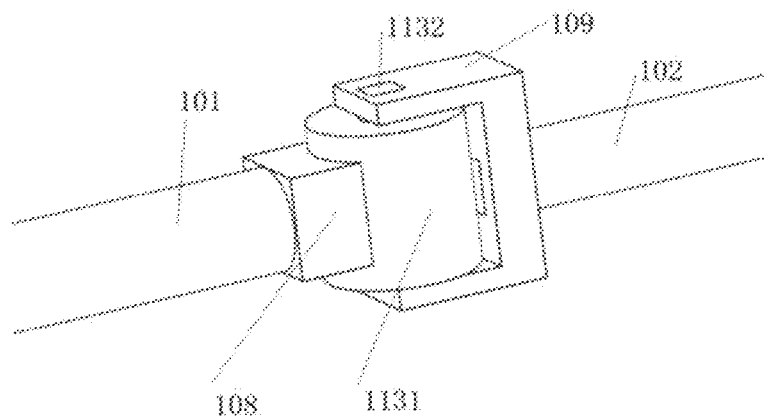
FIG. 7 is a schematic diagram of a leading multi-connecting-rod structure of a wing structure with three multi-connecting-rod structures according to an embodiment of the disclosure.

The first leading connecting rod 101 and the second leading connecting rod 102 are connected by the third leading motor 113, as described above. Specifically, as shown in FIGS. 6 and 7, the third leading motor 113 includes the third leading motor stator 1131 and third leading motor rotor 1132. The third leading motor rotor 1132 is located in the third leading motor stator 1131, and the third leading motor rotor 1132 is provided at the second end of the first leading connecting rod 101. The first leading connecting rod 101 is connected to the third leading motor stator 1131 by means of the third leading connector 108, a fourth leading connector 109 is provided at the first end of the second leading connecting rod 102, and the third leading motor rotor 1132 is connected to the second leading connecting rod 102 by means of the fourth leading connector 109. For example, the fourth leading connector 109 is a U-shaped connector, and the third leading motor rotor 1132 is rotatably connected with the two sides of the fourth leading connector 109, and the bottom edge of the fourth leading connector 109 is connected to the first end of the second leading connecting rod 102.

Figure 8:
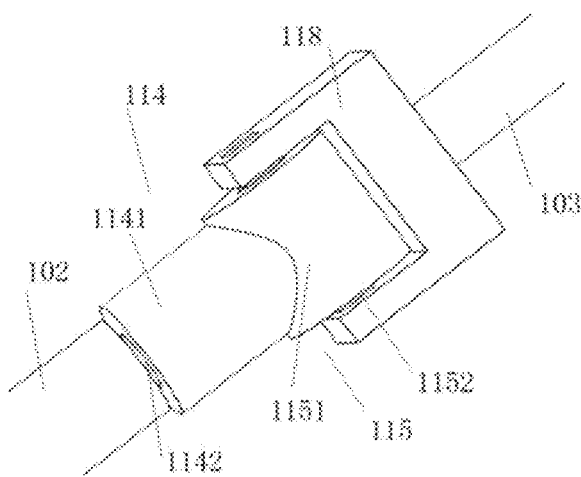
FIG. 8 is a schematic diagram of a leading multi-connecting-rod structure of a wing structure with three multi-connecting-rod structures according to an embodiment of the disclosure.
Figure 9:
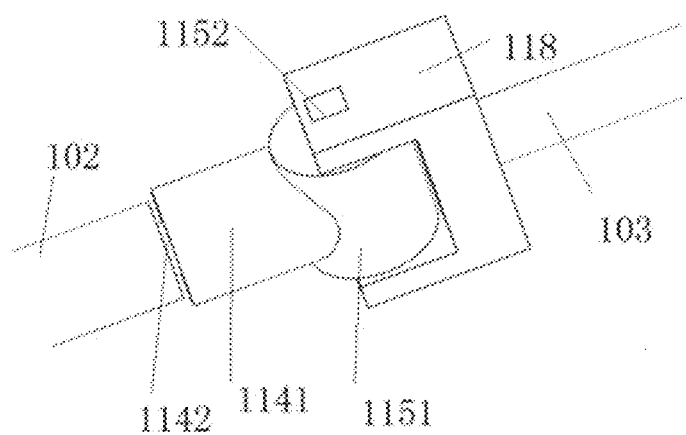
FIG. 9 is a schematic diagram of a leading multi-connecting-rod structure of a wing structure with three multi-connecting-rod structures according to an embodiment of the disclosure.

The second leading connecting rod 102 and the third leading connecting rod 103 are connected by the fourth leading motor 114 and the fifth leading motor 115, as described above. The fourth leading motor 114 and the fifth leading motor 115 cooperate with each other so that the distal portion of the wing structure away from the main body of the vehicle can achieve the ability to swing vertically along the plane of the wing body near a trunk end of the wing, and the distal portion of the wing structure away from the main body of the vehicle have the ability to twist and swing in the spanwise direction. Specifically, as shown in FIGS. 8 and 9, the fourth leading motor 114 includes a fourth leading motor stator 1141 and a fourth leading motor rotor 1142, and the fifth leading motor 115 includes a fifth leading motor stator 1151 and a fifth leading motor rotor 1152. The fourth leading motor rotor 1142 is located in the fourth leading motor stator 1141, the fifth leading motor rotor 1152 is located in the fifth leading motor stator 1151, the second leading connecting rod 102 is coaxially connected to the fourth leading motor rotor 1142, and the fourth leading motor stator 1141 and the fifth leading motor stator 1151 are vertically connected to each other. A fifth leading connector 118 is provided at the first end of the third leading connecting rod 103. The fifth leading motor rotor 1152 are connected to the third leading connecting rod 103 by means of the fifth leading connector 118, so that the fifth leading motor 115 can make the wing structure realize the torsion action in the spanwise direction. For example, the fifth leading connector 118 is a U-shaped connector, the fifth leading motor rotor 1152 is rotatably connected to the two sides of the fifth leading connector 118, and the bottom edge of the fifth leading connector 110 is connected to the first end of the third leading connecting rod 103.

Figure 10:
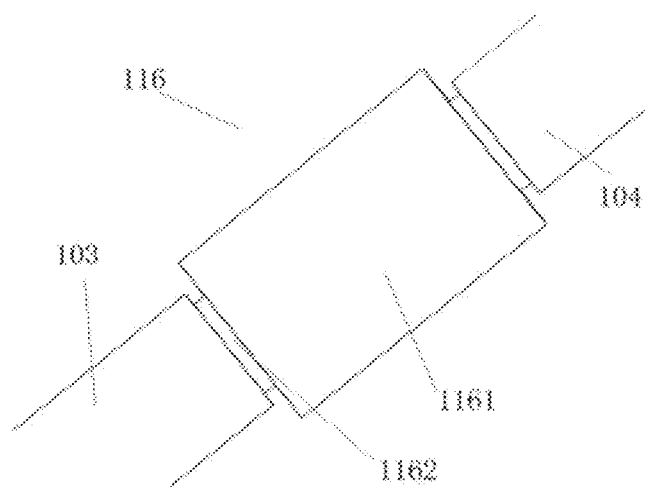
FIG. 10 is a schematic diagram of a leading multi-connecting-rod structure of a wing structure with three multi-connecting-rod structures according to an embodiment of the disclosure.

The third leading connecting rod 103 and the fourth leading connecting rod 104 are connected by the sixth leading motor 116, as mentioned above. The sixth leading motor 116 can enable the distal portion of the wing structure to achieve a pitching motion. Specifically, as shown in FIG. 10, the sixth leading motor 116 includes a sixth leading motor rotor 1161 and a sixth leading motor stator 1162, in which the sixth leading motor stator 1162 is located in the sixth leading motor rotor 1161, the third leading connecting rod 103 is coaxially connected to the first end of the sixth leading motor stator 1162, and the second end of the sixth leading motor stator 1162 is coaxially connected to the fourth leading connecting rod 104.

Figure 11:
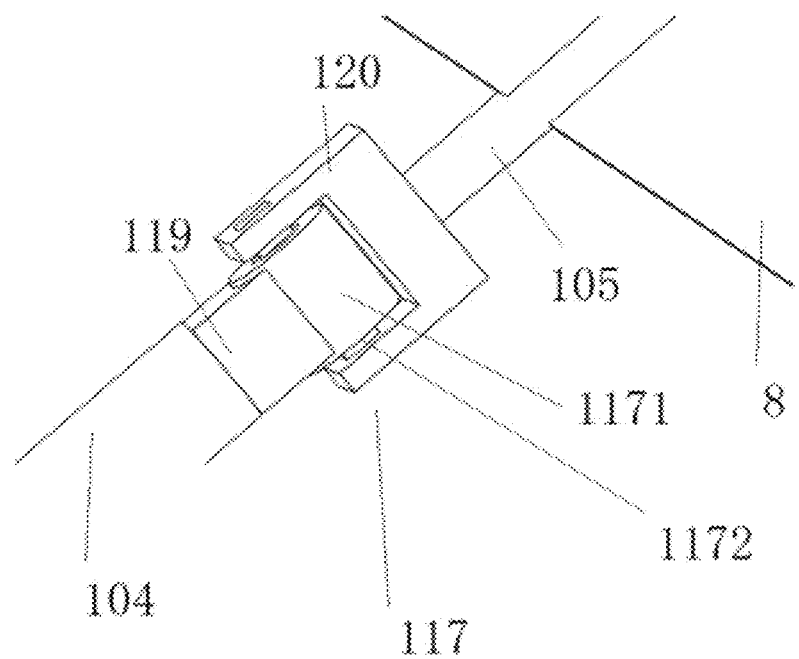
FIG. 11 is a schematic diagram of a leading multi-connecting-rod structure of a wing structure with three multi-connecting-rod structures according to an embodiment of the disclosure.
Figure 12:
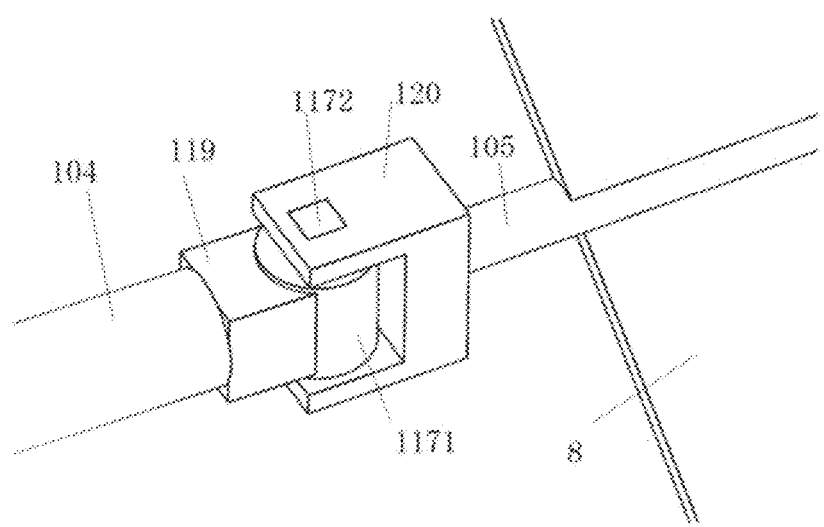
FIG. 12 is a schematic diagram of a leading multi-connecting-rod structure of a wing structure with three multi-connecting-rod structures according to an embodiment of the disclosure.

The fourth leading connecting rod 104 and the fifth leading connecting rod 105 are connected by the seventh leading motor 117, as described above. Specifically, as shown in FIGS. 11 and 12, the seventh leading motor 117 includes a seven leading motor stator 1171 and a seventh leading motor rotor 1172, in which the seventh leading motor rotor 1172 is located in the seventh leading motor stator 1171, and a sixth leading connector 119 is provided at the second end of the fourth leading connecting rod 104, the fourth leading connecting rod 104 is connected to the seventh leading motor stator 1171 by means of the sixth leading connector 119, a seventh leading connector 120 is provided at the first end of the fifth leading connecting rod 105, and the seventh leading motor rotor 1172 is connected to the fifth leading connecting rod 105 by means of the seventh leading connector 120. For example, the seventh leading connector 120 is a U-shaped connector, and the seventh leading motor rotor 1172 is rotatably connected to the two sides of the seventh leading connector 120, the bottom edge of the seventh leading connector 120 is connected to the first end of the fifth leading connecting rod 105, and the second end of the fifth leading connecting rod 105 is connected to the leading end rib 8.

Figure 13:
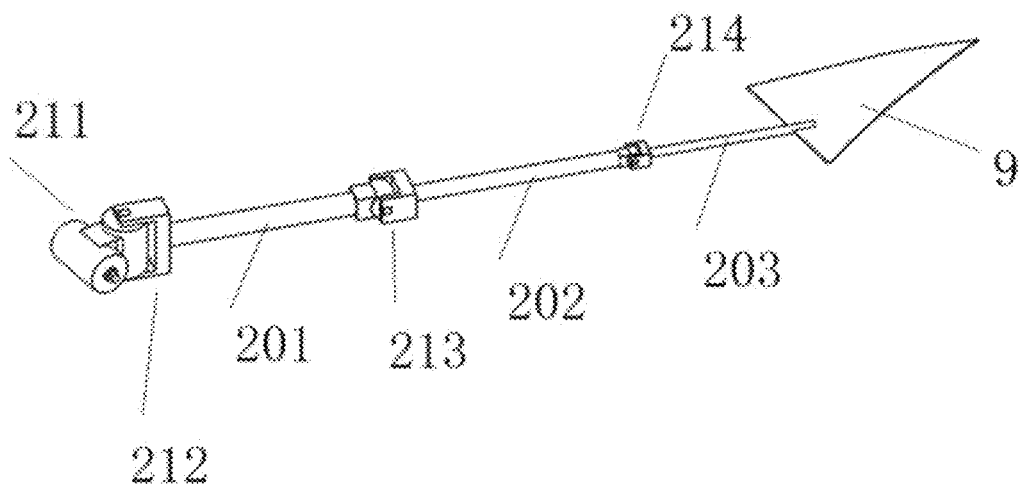
FIG. 13 is a schematic diagram of a middle multi-connecting-rod structure of a wing structure with three multi-connecting-rod structures according to an embodiment of the disclosure.

FIG. 13 shows the middle multi-connecting-rod structure located in the middle of the wing, which includes a first middle connecting rod 201, a second middle connecting rod 202 and a third middle connecting rod 203 that are connected in sequence, in which the first middle connecting rod 201 is connected to the support connecting rod 10, and the third middle connecting rod 203 is connected to the middle end rib 9.

In order to enable the middle multi-connecting-rod structure in the middle of the wings to swing with multiple degrees of freedom, the middle connecting rod and the support connecting rod are connected by a motor, and the adjacent middle connecting rods are connected by a motor. Specifically, the first middle connecting rod 101 is connected to the support connecting rod 10 by the first middle motor 211 and the second middle motor 212, the first middle connecting rod 201 is connected to the second middle connecting rod 202 by the third middle motor 213, and the second middle connecting rod 202 is connected to the third middle connecting rod 203 by the fourth middle motor 214. The first middle motor 211 is an outer-rotor motor, and the second middle motor 212, the third middle motor 213 and the fourth middle motor 214 are inner-rotor motors.

It should be noted that, in the embodiment of the present disclosure, the number of the connecting rods and the arrangement of the motors between the connecting rods can be adjusted and set according to the actual situations, and are not limited to the arrangement in the embodiment.

Figure 14:
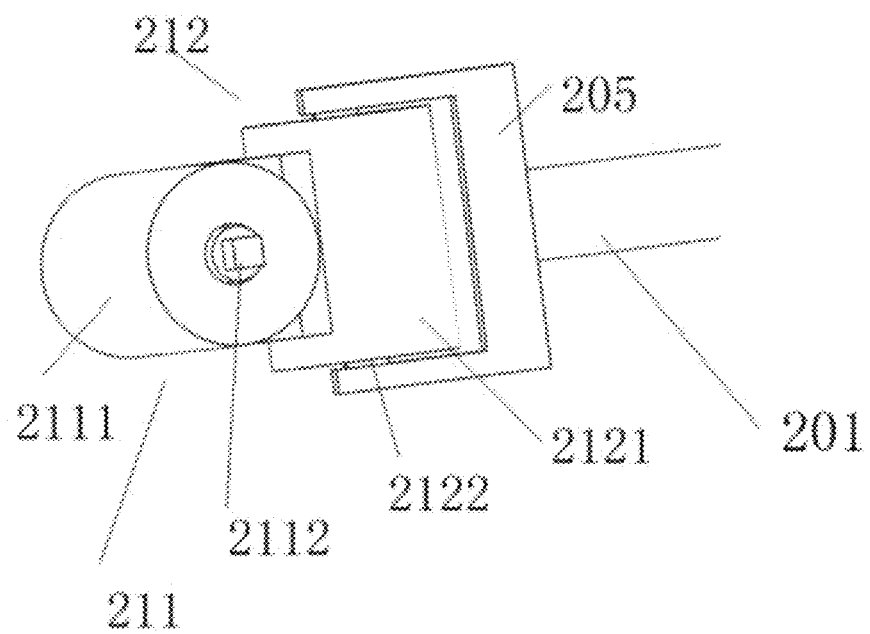
FIG. 14 is a schematic diagram of a middle multi-connecting-rod structure of a wing structure with three multi-connecting-rod structures according to an embodiment of the disclosure.
Figure 15:
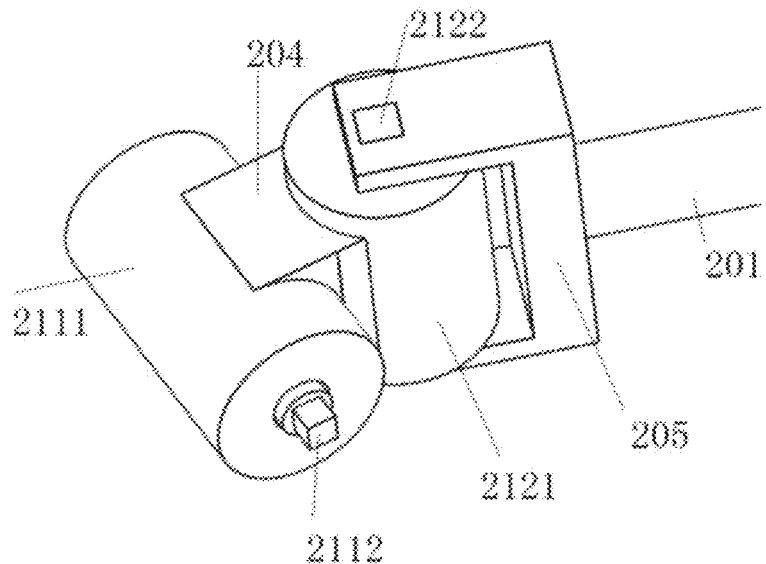
FIG. 15 is a schematic diagram of a middle multi-connecting-rod structure of a wing structure with three multi-connecting-rod structures according to an embodiment of the disclosure.

Further, as described above, the first middle connecting rod 201 and the support connecting rod 10 are connected by the first middle motor 211 and the second middle motor 212, and the first middle motor 211 and the second middle motor 212 cooperate with each other to enable the wings structure to achieve the ability to swing vertically along the plane where the main body of the vehicle is located, and at the same time, to enable the wing structure to achieve the ability to swing longitudinally along the main body of the vehicle. Specifically, as shown in FIGS. 14 and 15, the first middle motor 211 includes a first middle motor rotor 2111 and a first middle motor stator 2112, the second middle motor 212 includes a second middle motor stator 2121 and a second middle motor rotor 2122. The first middle motor stator 2112 is located in the first middle motor rotor 2111, and the second middle motor rotor 2122 is located in the second middle motor stator 2121. The first middle motor stator 2112 is connected to the support connecting rod 10 so that the first middle motor stator 2112 and the support connecting rod 10 are coaxially arranged, and the first middle motor rotor 2111 is connected to the second middle motor stator 2121 by the first middle connector 204 so that the directions of the first middle motor stator 2112 and the second middle motor rotor 2122 are perpendicular to each other. The second middle connector 205 is disposed at the first end of the first middle connecting rod 201, and the second middle motor stator 2121 is connected to the first middle connecting rod 101 by means of the second middle connector 205. For example, the first middle connector 204 and the second middle connector 205 are U-shaped connectors, the first middle motor rotor 2111 is fixedly arranged between the two sides of the first middle connector 204, the bottom edge of the first middle connector 204 is connected with the side surface of the second middle motor stator 2121. The second middle motor rotor 2122 is rotatably connected to the two sides of the second middle connector 205 middle motor stator 2121, and the bottom edge of the second middle connector 205 is connected to the first end of the first middle connecting rod 201.

Figure 16:
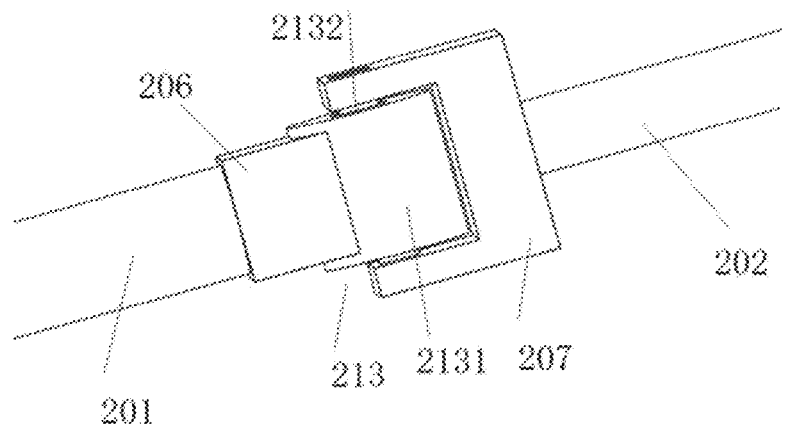
FIG. 16 is a schematic diagram of a middle multi-connecting-rod structure of a wing structure with three multi-connecting-rod structures according to an embodiment of the disclosure.
Figure 17:
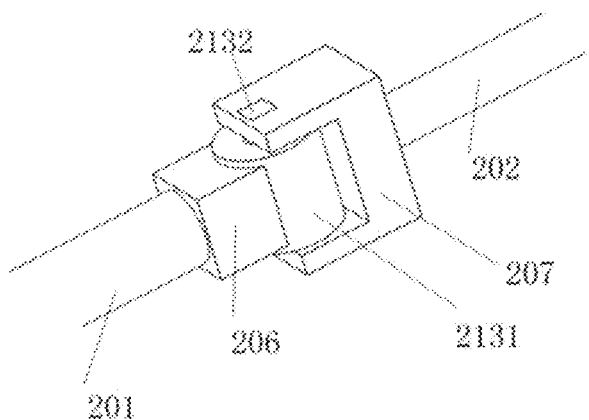
FIG. 17 is a schematic diagram of a middle multi-connecting-rod structure of a wing structure with three multi-connecting-rod structures according to an embodiment of the disclosure.

The first middle connecting rod 201 and the second middle connecting rod 202 are connected by the third middle motor 213, as described above. Specifically, as shown in FIGS. 16 and 17, the third middle motor 213 includes a third middle motor stator 2131 and the third middle motor rotor 2132, where the third middle motor rotor 2132 is located in the third middle motor stator 2131, and a third middle connector 206 is provided at the second end of the first middle connecting rod 201, and the first middle connecting rod 201 is connected to the third middle motor stator 2131 by means of the third middle connector 206. A fourth middle connector 207 is provided at the first end of the second middle connecting rod 202, and the third middle motor rotor 2132 is connected to the second middle connecting rod 202 by means of the fourth middle connector 207. For example, the fourth middle connecting rod 207 is a U-shaped connecting rod, the third middle motor rotor 2132 is rotatably connected to two sides of the fourth middle connector 207, and the bottom edge of the fourth middle connector 207 is connected to the first end of the second middle connecting rod 202.

Figure 18:
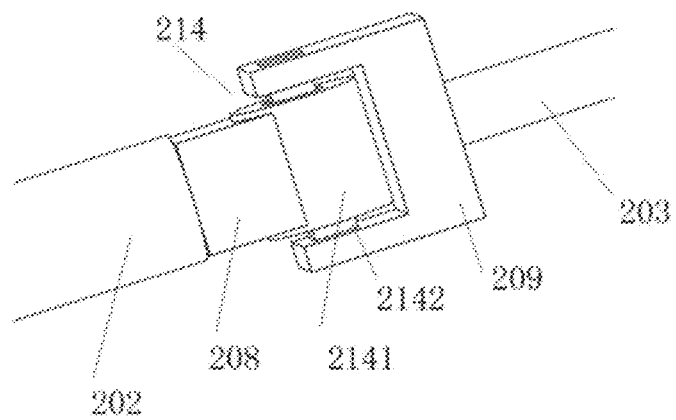
FIG. 18 is a schematic diagram of a middle multi-connecting-rod structure of a wing structure with three multi-connecting-rod structures according to an embodiment of the disclosure.
Figure 19:
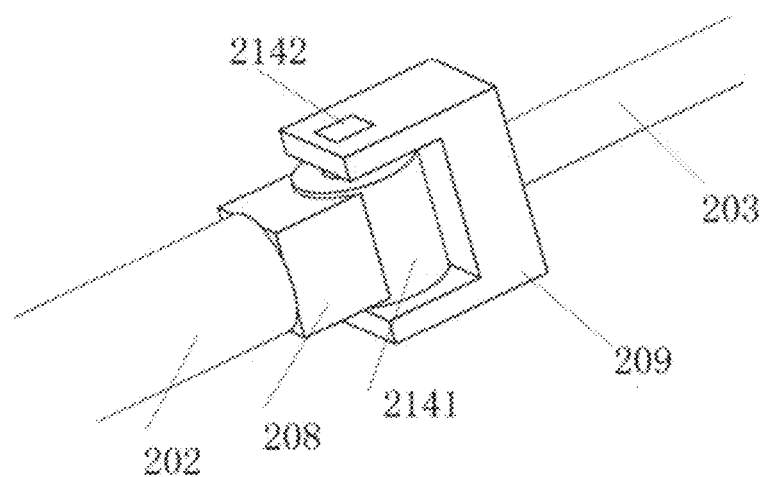
FIG. 19 is a schematic diagram of a middle multi-connecting-rod structure of a wing structure with three multi-connecting-rod structures according to an embodiment of the disclosure.

The second middle connecting rod 202 and the third middle connecting rod 203 are connected by the fourth middle motor 214, as described above. Specifically, as shown in FIGS. 18 and 19, the fourth middle motor 214 includes a fourth middle motor stator 2141 and the fourth middle motor rotor 2142, where the fourth middle motor rotor 2142 is located in the fourth middle motor stator 2141, a fifth middle connector 208 is provided at the second end of the second middle connecting rod 202, and the second middle connecting rod 202 is connected to the fourth middle motor stator 2141 by means of the fifth middle connector 208. The sixth middle connector 209 is provided at the first end of the third middle connecting rod 203, and the fourth middle motor rotor 2142 is connected to the third middle connecting rod 203 by means of the sixth middle connector 209. For example, the sixth middle connector 209 is a U-shaped connector, the fourth middle motor rotor 2142 is rotatably connected to the two sides of the sixth middle connector 209, and the bottom edge of the sixth middle connector 209 is connected to the first end of the third middle connecting rod 203, and the second end of the third middle connecting rod 203 is connected to the middle end rib 9.

Figure 20:
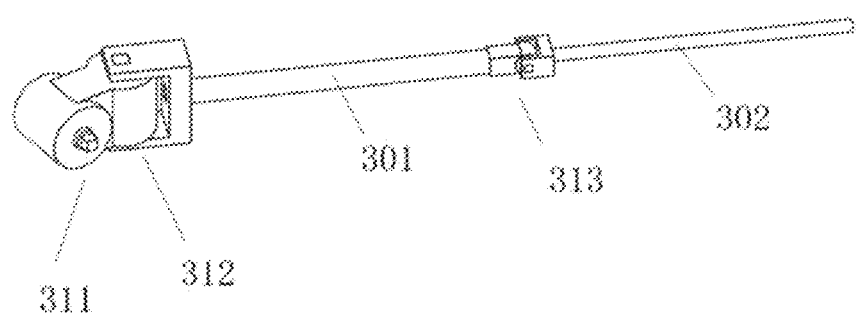
FIG. 20 is a schematic diagram of a trailing multi-connecting-rod structure of a wing structure with three multi-connecting-rod structures according to an embodiment of the disclosure.

FIG. 20 shows a trailing multi-connecting-rod structure located at the trailing edge of the wing, which includes a first trailing connecting rod 301 and a second trailing connecting rod 302 that are connected in sequence, where the first trailing connecting rod 301 is connected to the support connecting rod 10.

In order to enable the trailing multi-connecting-rod structure of the trailing edge of the wing to swing with multiple degrees of freedom, the trailing connecting rod and the support connecting rod are connected by a motor, and the adjacent trailing connecting rods are connected by a motor. Specifically, the first trailing connecting rod 301 and the support connecting rod 10 are connected by the first trailing motor 311 and the second trailing motor 312, and the first trailing connecting rod 301 and the second trailing connecting rod 302 are connected by the third trailing motor 313. The first trailing motor 311 is an outer-rotor motor, and the second trailing motor 312 and the third trailing motor 313 are inner-rotor motors.

It should be noted that, in the embodiment of the present disclosure, the number of the connecting rods and the arrangement of the motors between the connecting rods can be adjusted and set according to the actual situations, and are not limited to the arrangement in the embodiment.

Figure 21:
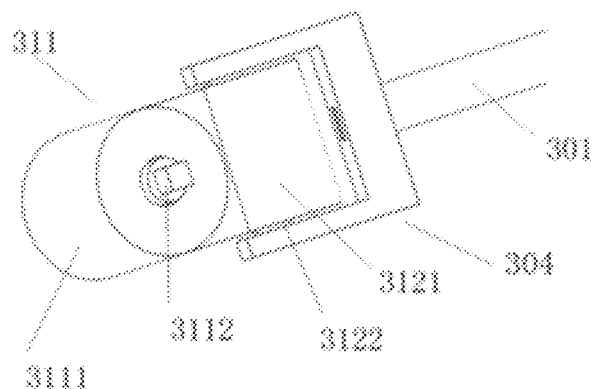
FIG. 21 is a schematic diagram of a trailing multi-connecting-rod structure of a wing structure with three multi-connecting-rod structures according to an embodiment of the disclosure.
Figure 22:
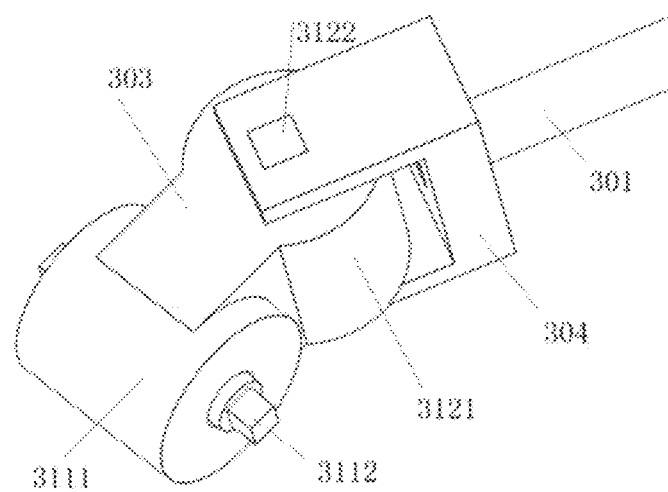
FIG. 22 is a schematic diagram of a trailing multi-connecting-rod structure of a wing structure with three multi-connecting-rod structures according to an embodiment of the disclosure.

Further, as described above, the first trailing connecting rod 301 and the support connecting rod 10 are connected by the first trailing motor 311 and the second trailing motor 312, and the first trailing motor 311 and the second trailing motor 312 cooperate each other to enable the wing structure to swing vertically along the plane where the main body of the vehicle is located, and at the same time, to enable the wing structure to swing longitudinally along the main body of the vehicle. Specifically, as shown in FIGS. 21 and 22, the first trailing motor 311 includes a first trailing motor rotor 3111 and a first trailing motor stator 3112, and the second trailing motor 312 includes a second trailing motor stator 3121 and a second trailing motor rotor 3122. The first trailing motor stator 3112 is located in the first trailing motor rotor 3111, the second trailing motor rotor 3122 is located in the second trailing motor stator 3121, and the first trailing motor stator 3112 is connected to the support connecting rod 10, so that the first trailing motor stator 3112 and the support connecting rod 10 are coaxially arranged. The first trailing motor rotor 3111 is connected to the second trailing motor stator 3121 by means of the first trailing connector 303, so that the directions of the first trailing motor stator 3112 and the second trailing motor rotor 3122 are perpendicular to each other. A second trailing connector 304 is provided at the first end of the first trailing connecting rod 301, and the second trailing motor stator 3121 is connected to the first trailing connecting rod 301 by means of the second trailing connector 304. For example, the first trailing connector 303 and the second trailing connector 304 are U-shaped connectors, the first trailing motor rotor 3111 is fixedly arranged between the two sides of the first trailing connector 303, the bottom edge of the first trailing connector 303 is connected to the side surface of the second trailing motor stator 3121, the second trailing motor rotor 3122 is rotatably connected to the two sides of the second trailing connector 304, and the bottom edge of the second trailing connector 304 is connected to the first end of the first trailing connecting rod 301.

Figure 23:
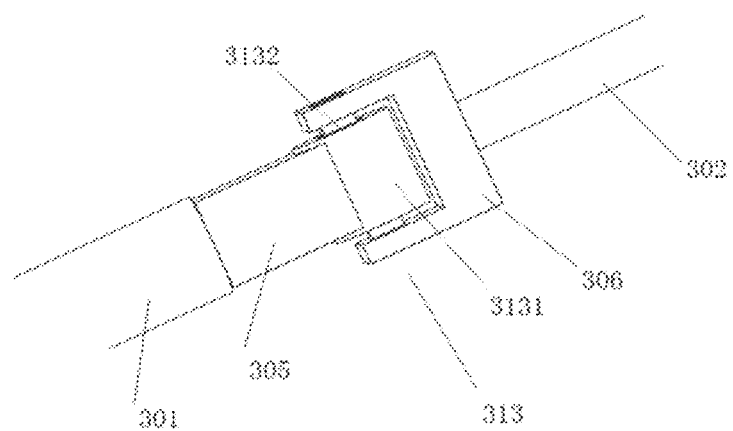
FIG. 23 is a schematic diagram of a trailing multi-connecting-rod structure of a wing structure with three multi-connecting-rod structures according to an embodiment of the disclosure.
Figure 24:
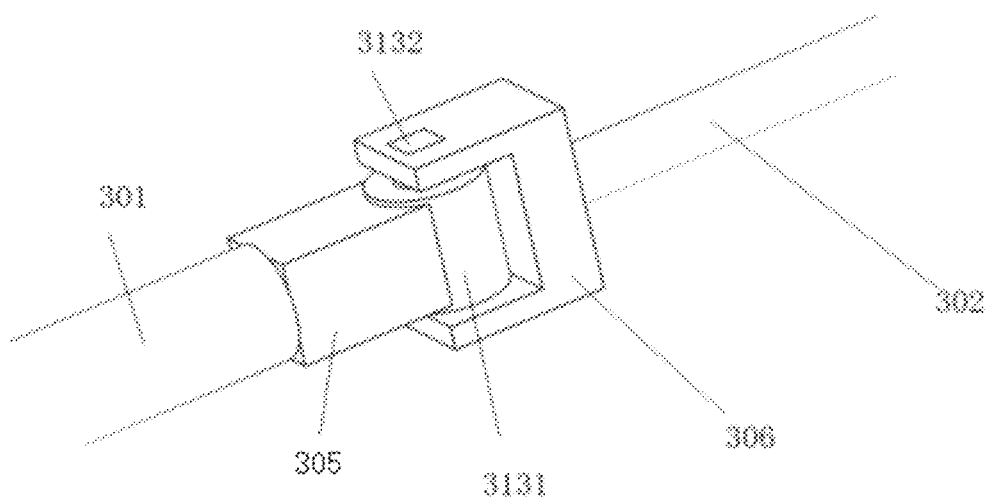
FIG. 24 is a schematic diagram of a trailing multi-connecting-rod structure of a wing structure with three multi-connecting-rod structures according to an embodiment of the disclosure.

The first trailing connecting rod 301 and the second trailing connecting rod 302 are connected by the third trailing motor 313, as described above. Specifically, as shown in FIG. 23 and FIG. 24, the third trailing motor 313 includes a third trailing motor stator 3131 and a third trailing motor rotor 3132, where the third trailing motor rotor 3132 is located in the third trailing motor stator 3131, a third trailing connector 305 is provided at the second end of the first trailing connecting rod 301, and the first trailing connecting rod 301 is connected to the third trailing motor stator 3131 by means of the third trailing connector 305. A fourth trailing connector 306 is provided at the first end of the second trailing connecting rod 302, and the third trailing motor rotor 3132 is connected to the second trailing connecting rod 302 by means of a fourth trailing connector 306. For example, the fourth trailing connector 306 is a U-shaped connector, and the third trailing motor rotor 3132 is rotatably connected to the two sides of the fourth trailing connector 306, and the bottom edge of the fourth trailing connector 306 is connected to the first end of the second trailing connecting rod 302.

Figure 25:
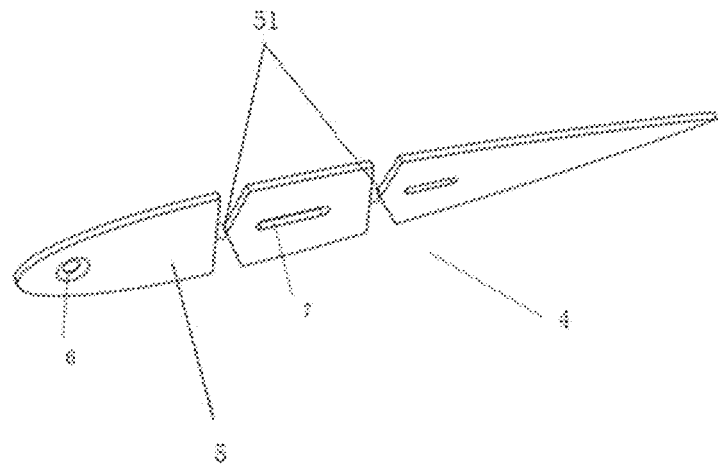
FIG. 25 is a schematic structural diagram of a rib in a wing structure with three multi-connecting-rod structures according to an embodiment of the disclosure.

As shown in FIG. 1, multiple groups of ribs 4 are sleeved between the leading multi-connecting-rod structure 1, the middle multi-connecting-rod structure 2 and the trailing multi-connecting-rod structure 3. Each group of ribs includes at least one rib unit 5, adjacent rib units 5 are connected by ball hinging, for example, connected by a ball hinge 51, as illustrated in FIG. 25. In this way, the adjacent rib units 5 can rotate relative to each other. Each rib unit 5 is sleeved onto the corresponding connecting rod mechanism, and the number of the rib unit 5 is adjusted according to the width of the wing. As an example, the leading multi-connecting-rod structure 1, the middle multi-connecting-rod structure 2 and the trailing multi-connecting-rod structure 3 are provided with rib units 5 at a position of the support connecting rod 10 proximate to the main body of the vehicle. The leading multi-connecting-rod structure 1 and the middle multi-connecting-rod structure 2 are provided with rib units 5 at a position located in the middle of the wing structure. The rib unit 5 can be only sleeved onto the leading multi-connecting-rod structure 1 at the position close to the wingtip. Further, the front end and the rear end of the rib unit 5 sleeved on the same multi-connecting-rod structure are connected by a fixing part 52, and the fixing part 52 herein can be elastic fiber wire or metal wire, so as to ensure that the rib units 5 sleeved on the same multi-connecting-rod structure can swing synchronously based on the corresponding multi-connecting-rod structure, so as to realize the pitching motion of the wing structure.

Figure 26:
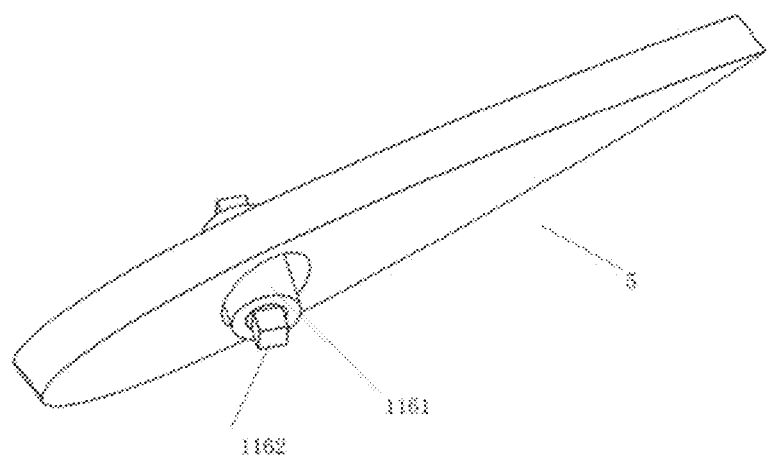
FIG. 26 is a schematic structural diagram of a rib unit in a rib of a wing structure with three multi-connecting-rod structures according to an embodiment of the disclosure.
Figure 27:
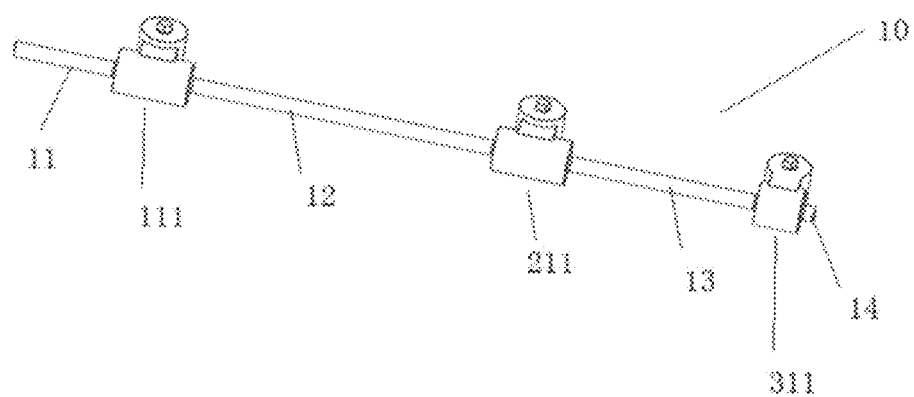
FIG. 27 is a schematic diagram of the connection between a connecting rod mechanism and a support structure of a wing structure with three multi-connecting-rod structures according to an embodiment of the disclosure.
Figure 28:
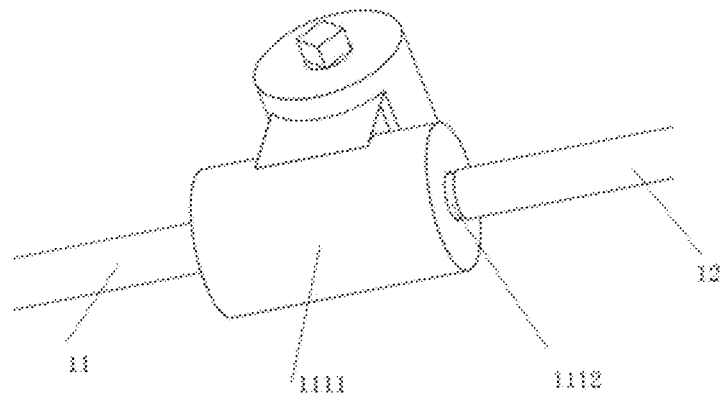
FIG. 28 is a schematic diagram of the connection between a connecting rod mechanism and a support structure of a wing structure with three multi-connecting-rod structures according to an embodiment of the disclosure.
Figure 29:
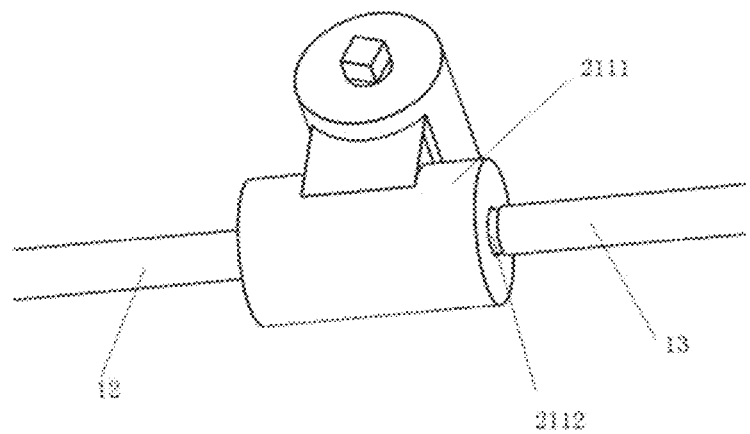
FIG. 29 is a schematic diagram of the connection between a connecting rod mechanism and a support structure of a wing structure with three multi-connecting-rod structures according to an embodiment of the disclosure.
Figure 30:
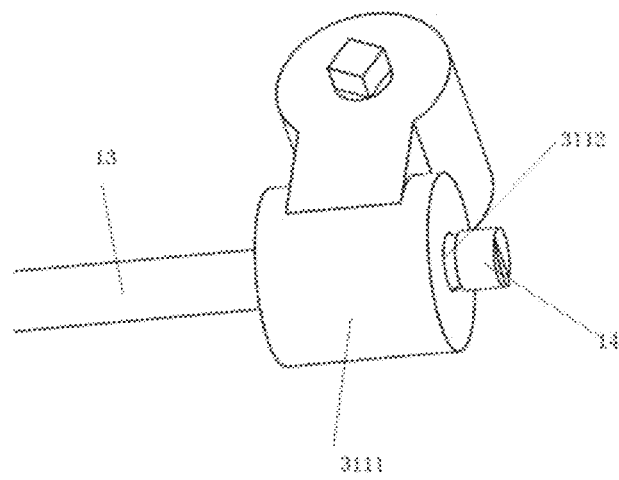
FIG. 30 is a schematic diagram of the connection between a connecting rod mechanism and a support structure of a wing structure with three multi-connecting-rod structures according to an embodiment of the disclosure.

In one embodiment, a conical hole 6 is provided on the rib unit 5 sleeved with the leading multi-connecting-rod structure 1 in order to facilitate the swinging of different connecting rod mechanisms. Therefore, the rib units 5 are sleeved with the leading multi-connecting-rod structure 1 to act as passive ribs to swing up and down, left and right. Such a rib unit 5 can swing freely with the swinging of the connecting rod mechanism. A chute 7 is provided on the rib unit 5 sleeved with the middle multi-connecting-rod structure 2 or the trailing multi-connecting-rod structure 3 so that the distance between the multi-connecting-rod structures can be adjusted to a certain extent. Thus, asynchronous swinging between the leading multi-connecting-rod structure 1 and the middle multi-connecting-rod structure 2 is made possible so as to control the variable pitch angle of the wing structure. Of course, in another embodiment, the rib unit 5 sleeved with the leading multi-connecting-rod structure 1 is constructed differently. The rib unit 5 can be sleeved to the motor on the connecting-rod mechanism as an active-drive rib, so as to be driven by the movement of the motor. For example, as shown in FIG. 26, the active-drive rib can generally be disposed at the position of the wing structure close to the wingtip. The rib unit 5 can be sleeved on the outer side of the sixth leading motor rotor 1161 of the sixth leading motor 116, and two protrusions are provided on the surface of the sixth leading motor rotor 1161 to play a limiting role. The rib unit 5 can be sleeved between the two protruding parts and restricted to move between the two protrusions so that the position of the rib unit 5 is relatively fixed on the outer side of the sixth leading motor rotor 1161 without sliding in the direction toward the skeleton of the main body of the vehicle or in the direction toward the wingtip. It should be noted that the sizes of the rib units 5 sleeved on different connecting-rod structures are adjusted depending on the airfoil.

Further, given that the first leading connecting rod 101 and the support connecting rod 10 are connected by the first leading motor 111 and the second leading motor 112, the first middle connecting rod 101 and the support connecting rod 10 are connected by the first middle motor 211 and the second middle motor 212, and the first trailing connecting rod 301 and the support connecting rod 10 are connected by the first trailing motor 311 and the second trailing motor 312. As shown in FIGS. 27-30, the support connecting rod 10 includes a first segment 11, a second segment 12, a third segment 13 and a fourth segment 14, in which two ends of the first leading motor stator 1112 of the first leading motor 111 are coaxially connected to the first segment 11 and the second segment 12 respectively, two ends of the first middle motor stator 2112 of the first middle motor 211 are coaxially connected to the second segment 12 and the third segment 13 respectively, and two ends of the first trailing motor stator 3112 of the first trailing motor 311 are coaxially connected to the third segment 13 and the fourth segment 14 respectively.

With the wing structure of this embodiment, when the first leading motor 111, the third leading motor 113, the fifth leading motor 115 and the seventh leading motor 117 are caused to rotate, the corresponding middle motors rotate in the same direction so that the corresponding connecting rod swings up and down to allow the wing structure to swing up and down. When the second leading motor 112, the second middle motor 212 and the second trailing motor 312 are caused to swing synchronously, the wing structure can swing back and forth. When the fourth leading motor 114 is caused to rotate, the end portion of the wing structure can twist.

Embodiments of the present disclosure provide wing structures that feature a morphing wing having a large range in both chordwise and spanwise directions. The wing structure is designed with the capability of changing airfoil and changing a pitch angle within a large range, the capability of twisting along a spanwise direction at a distal portion, the capability of swinging perpendicularly within a large range along the plane in which the main body of the vehicle is located, and the capability of swinging longitudinally within a large range along the main body of the vehicle. Adjustment can be made for a complex flow field or environment, the motion speed and the motion efficiency are significantly improved, and high maneuvering actions can be achieved.

In the following second embodiment, the implementation of the wing structure by means of two multi-connecting-rod structures is described in detail.

Figure 31:
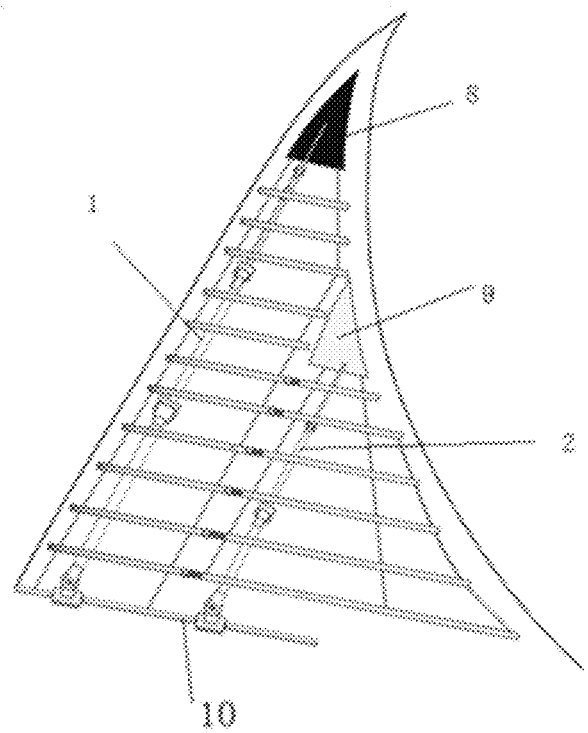
FIG. 31 is a schematic diagram of a wing structure with two multi-connecting-rod structures according to an embodiment of the disclosure.
Figure 32:
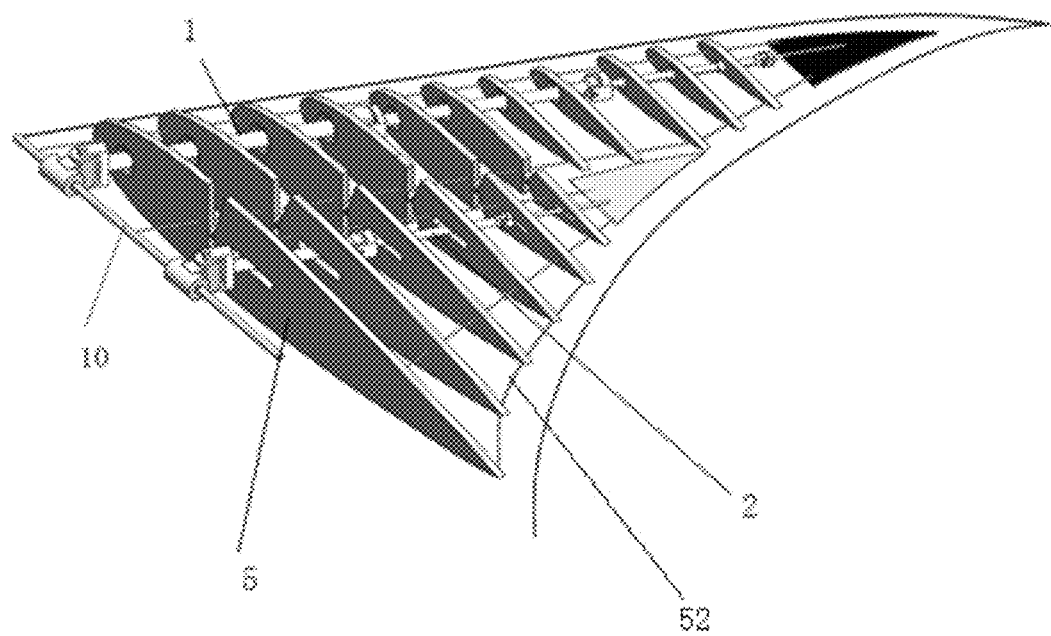
FIG. 32 is a schematic diagram of a wing structure with two multi-connecting-rod structures according to an embodiment of the disclosure.
Figure 33:
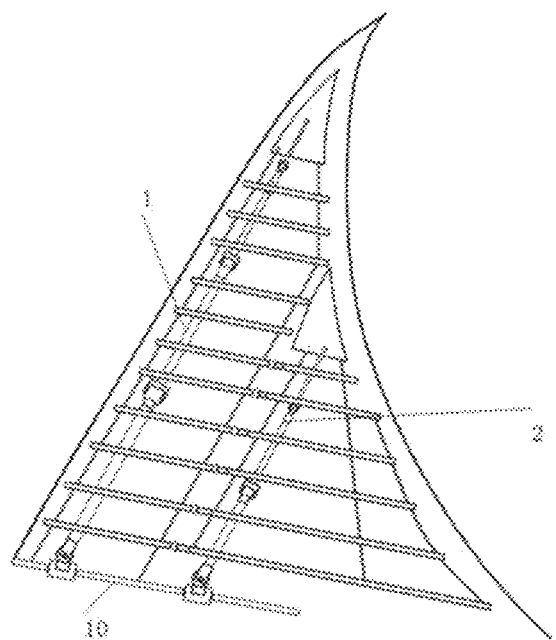
FIG. 33 is a schematic diagram of a wing structure with two multi-connecting-rod structures according to an embodiment of the disclosure.

FIGS. 31, 32 and 33 respectively show the structural schematic diagram of the wing structure with two multi-connecting-rod structures. In this wing structure, two multi-connecting-rod structures are sequentially arranged in the direction extending from the main body of the vehicle to the wingtip at leading edge and the middle portion of the wing respectively, which are the leading multi-connecting-rod structure 1 and the middle multi-connecting-rod structure 2, which are arranged sequentially from the head to the tail of the main body of the vehicle and whose total length decreases in sequence. The first ends of two multi-connecting-rod structures are connected to the support connecting rod 10 located on the main body of the vehicle, and the direction of the support connecting rod 10 is consistent with the depth direction of the main body of the vehicle. The movements of the two multi-connecting-rod structures are independent according to the control instructions to better simulate the movement of the creature. Ribs are sleeved between the above-mentioned multi-connecting-rod mechanisms. The ribs are composed of rib units. The rib units are usually be made of rigid materials. Preferably, the rib units near the tail of the vehicle can be made entirely of flexible material, or made of half rigid and half flexible material, so that the rib units located near the tail of the vehicle are enabled to passively deform flexibly. The wing structure in the embodiment of the present disclosure has the characteristics of a morphing wing in a large range in both the chordwise and spanwise directions, and has the capability of variable airfoil and wide range of pitch angles, the capability of twisting the distal portion of the wing structure away from the main body of the vehicle in the spanwise direction, the capability to swing vertically in a large range along the plane where the main body of the vehicle is located, and the capability to swing longitudinally in a large range along the main body of the vehicle.

Figure 34:
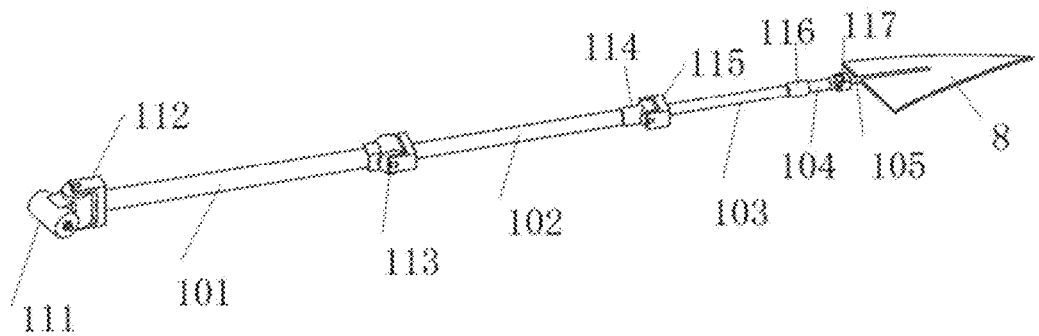
FIG. 34 is a schematic diagram of a leading multi-connecting-rod structure of a wing structure with two multi-connecting-rod structures according to an embodiment of the disclosure.

FIG. 34 shows the leading multi-connecting-rod structure located at the leading edge of the wing, which includes a first leading connecting rod 101, a second leading connecting rod 102, a third leading connecting rod 103, and a fourth leading connecting rod 104 and the fifth leading connecting rod 105 that are connected in sequence, in which the first leading connecting rod 101 is connected to the support connecting rod 10, and the fifth leading connecting rod 105 is connected to the leading end rib 8.

In order to enable the leading multi-connecting-rod structure of the leading edge of the wing to swing with multiple degrees of freedom, the leading connecting rod and the support connecting rod are connected by a motor, and the adjacent leading connecting rods are connected by a motor.

Specifically, the first leading connecting rod 101 and the support connecting rod 10 are connected by the first leading motor 111 and the second leading motor 112, and the first leading connecting rod 101 and the second leading connecting rod 102 are connected by the third leading motor 113 is connected, the second leading connecting rod 102 and the third leading connecting rod 103 are connected by the fourth leading motor 114 and the fifth leading motor 115, the third leading connecting rod 103 and the fourth leading connecting rods 104 are connected by a sixth leading motor 116, and the fourth leading connecting rod 104 and the fifth leading connecting rod 105 are connected by a seventh leading motor 117. The first leading motor 111 and the sixth leading motor 116 are outer-rotor motors, and the second leading motor 112, the third leading motor 113, the fourth leading motor 114, the fifth leading motor 115 and the seventh leading motor 117 are inner-rotor motor.

It should be noted that, in the embodiment of the present disclosure, the number of the connecting rods and the arrangement of the motors between the connecting rods can be adjusted and set according to the actual situation, and are not limited to the arrangement in the embodiment.

Figure 35:
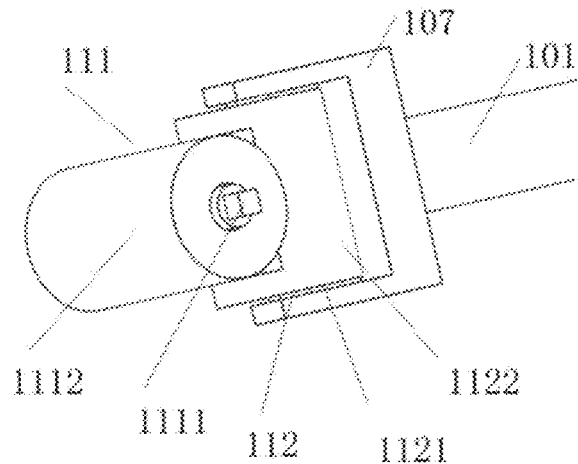
FIG. 35 is a schematic diagram of a leading multi-connecting-rod structure of a wing structure with two multi-connecting-rod structures according to an embodiment of the disclosure.
Figure 36:
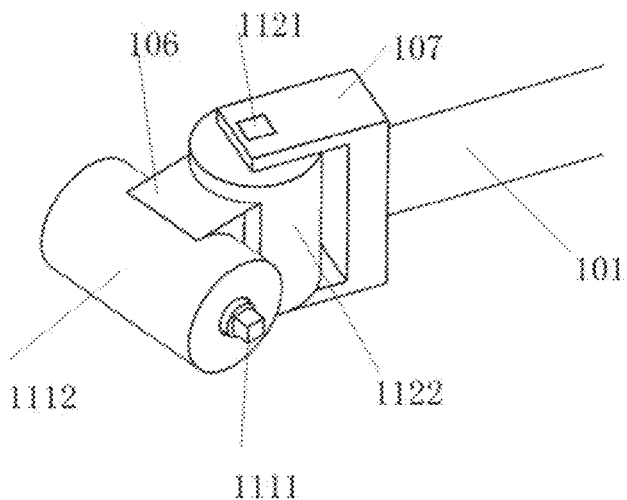
FIG. 36 is a schematic diagram of a leading multi-connecting-rod structure of a wing structure with two multi-connecting-rod structures according to an embodiment of the disclosure.

Further, as described above, the first leading connecting rod 101 and the support connecting rod 10 are connected by the first leading motor 111 and the second leading motor 112, and the first leading motor 111 and the second leading motor 112 cooperate with each other to enable the wing structure to swing vertically along the plane where the main body of the vehicle is located, and to enable the wing structure to swing longitudinally along the main body of the vehicle at the same time. Specifically, as shown in FIG. 35 and FIG. 36, the first leading motor 111 includes a first leading motor rotor 1111 and a first leading motor stator 1112, and the second leading motor 112 includes a second leading motor stator 1121 and a second leading motor rotor 1122, in which the first leading motor stator 1112 is located in the first leading motor rotor 1111, the second leading motor rotor 1122 is located in the second leading motor stator 1121, and the first leading motor stator 1112 is connected with the support connecting rod 10 so that the first leading motor stator 1112 and the support connecting rod 10 are coaxially arranged and the first leading motor rotor 1111 is connected to the second leading motor stator 1121 by the first leading connector 106. Thus, the directions of the first leading motor stator 1112 and the second leading motor rotor 1122 are perpendicular to each other. A second leading edge connector 107 is provided at the first end of the first leading connecting rod 101, and the second leading motor stator 1121 is connected to the first leading connecting rod 101 by means of the second leading connector 107. For example, the first leading connector 106 and the second leading connector 107 may be U-shaped connectors, the first leading motor rotor 1111 is fixedly arranged between the two sides of the first leading connector 106, the bottom edge of the first leading connector 106 is connected to the side surface of the second leading motor stator 1121, the second leading motor rotor 1122 is rotatably connected to the two sides of the second leading connector 107, and bottom edge of the second leading connector 107 is connected to the first end of the first leading connecting rod 101.

Figure 37:
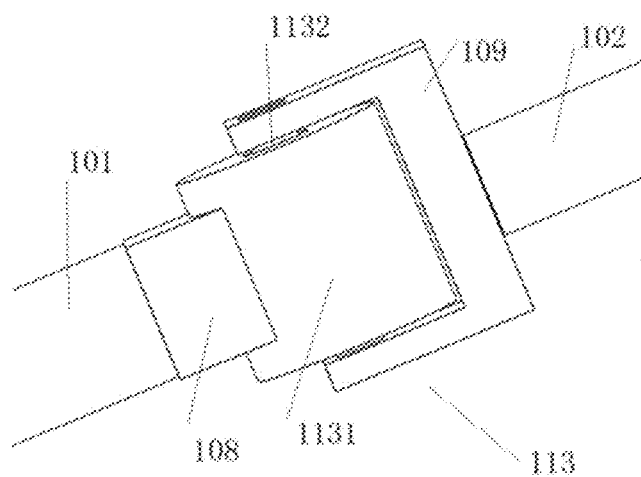
FIG. 37 is a schematic diagram of a leading multi-connecting-rod structure of a wing structure with two multi-connecting-rod structures according to an embodiment of the disclosure.
Figure 38:
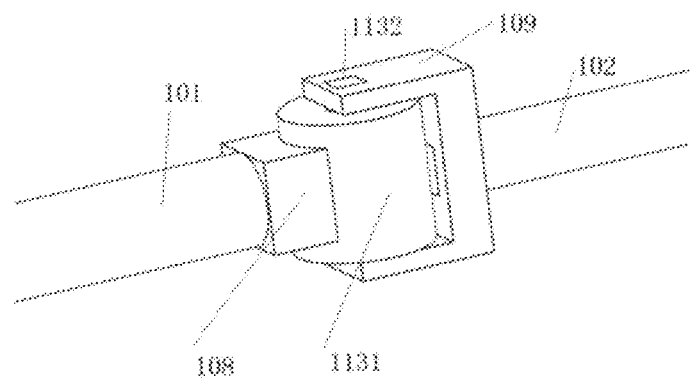
FIG. 38 is a schematic diagram of a leading multi-connecting-rod structure of a wing structure with two multi-connecting-rod structures according to an embodiment of the disclosure.

The first leading connecting rod 101 and the second leading connecting rod 102 are connected through the third leading motor 113, as described above. Specifically, as shown in FIGS. 37 and 38, the third leading motor 113 includes a first leading motor stator 1131 and a third leading motor rotor 1132, where the third leading motor rotor 1132 is located in the third leading motor stator 1131, a third leading connector 108 is provided at the second end of the first leading connecting rod 101, the first leading connecting rod 101 is connected with the third leading motor stator 1131 by means of the third leading connector 108, a fourth leading connector 109 is provided at the first end of the second leading connecting rod 102, and the third leading motor rotor 1132 is connected to the second leading connecting rod 102 by means of the fourth leading connector 109. For example, the fourth leading connector 109 is a U-shaped connector, and the third leading motor rotor 1132 is rotatably connected to the two sides of the fourth leading connector 109, and the bottom edge of the fourth leading connector 109 is connected to the first end of the second leading connecting rod 102.

Figure 39:
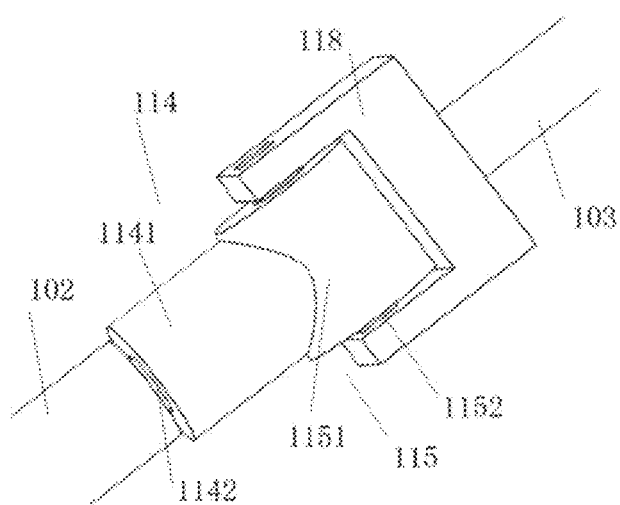
FIG. 39 is a schematic diagram of a leading multi-connecting-rod structure of a wing structure with two multi-connecting-rod structures according to an embodiment of the disclosure.
Figure 40:
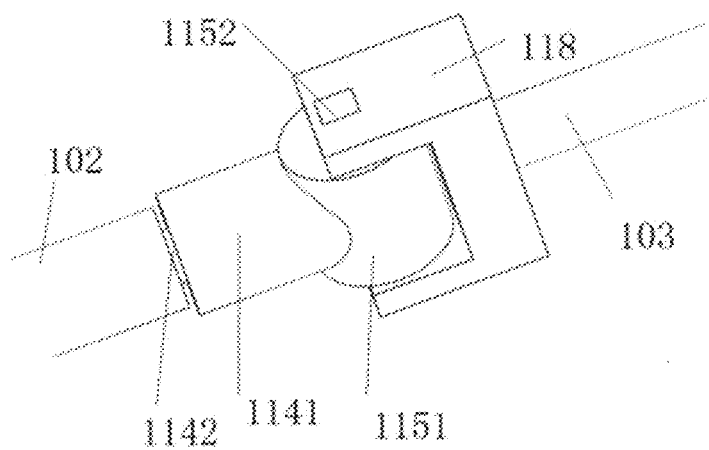
FIG. 40 is a schematic diagram of a leading multi-connecting-rod structure of a wing structure with two multi-connecting-rod structures according to an embodiment of the disclosure.

As described above, the second leading connecting rod 102 and the third leading connecting rod 103 are connected by the fourth leading motor 114 and the fifth leading motor 115, in which the fourth leading motor 114 and the fifth leading motor 115 cooperate with each other so that the distal portion of the wing structure away from the main body of the vehicle can swing vertically along the plane of the wing body near the trunk end of the wing, and the distal portion of the wing structure away from the main body of the vehicle can twist and swing in the spanwise direction. Specifically, as shown in FIGS. 39 and 40, the fourth leading motor 114 includes a fourth leading motor stator 1141 and a fourth leading motor rotor 1142, and the fifth leading motor 115 includes a fifth leading motor stator 1151 and a fifth leading motor rotor 1152. The fourth leading motor rotor 1142 is located in the fourth leading motor stator 1141, the fifth leading motor rotor 1152 is located in the fifth leading motor stator 1151, the second leading connecting rod 102 is coaxially connected to the fourth leading motor rotor 1142, and the fourth leading motor stator 1141 and the fifth leading motor stator 1151 are vertically connected to each other. A fifth leading connector 118 is provided at the first end of the third leading connecting rod 103, and the fifth leading motor rotor 1152 are connected to the third leading connecting rod 103 by means of the fifth leading connector 118, so that the fifth leading motor 115 can make the wing structure realize the torsion action in the spanwise direction. For example, the fifth leading connector 118 is a U-shaped connector, the fifth leading motor rotor 1152 is rotatably connected to the two sides of the fifth leading connector 118, and the bottom edge of the fifth leading connector 110 is connected to the first end of the third leading connecting rod 103.

Figure 41:
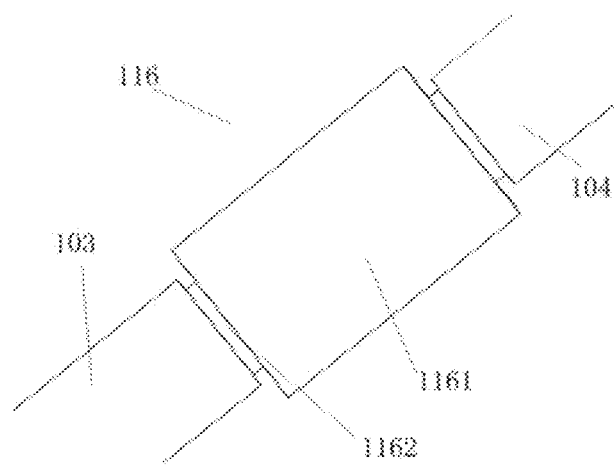
FIG. 41 is a schematic diagram of a leading multi-connecting-rod structure of a wing structure with two multi-connecting-rod structures according to an embodiment of the disclosure.

As mentioned above, the third leading connecting rod 103 and the fourth leading connecting rod 104 are connected by the sixth leading motor 116, in which the sixth leading motor 116 enables the distal portion of the wing structure to conduct a pitching motion. Specifically, as shown in FIG. 41, the sixth leading motor 116 includes a sixth leading motor rotor 1161 and a sixth leading motor stator 1162, where the sixth leading motor stator 1162 is located on the sixth leading motor rotor 1161, the third leading connecting rod 103 is coaxially connected to the first end of the sixth leading motor stator 1162, and the second end of the sixth leading motor stator 1162 is coaxially connected to the fourth leading connecting rod 104.

Figure 42:
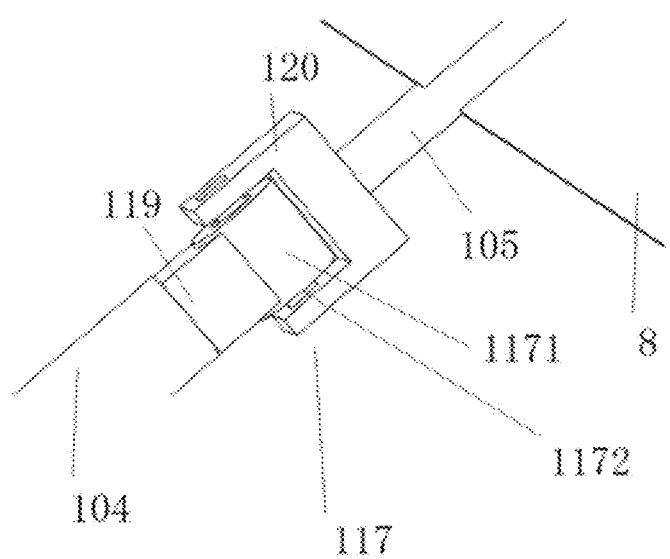
FIG. 42 is a schematic diagram of a leading multi-connecting-rod structure of a wing structure with two multi-connecting-rod structures according to an embodiment of the disclosure.
Figure 43:
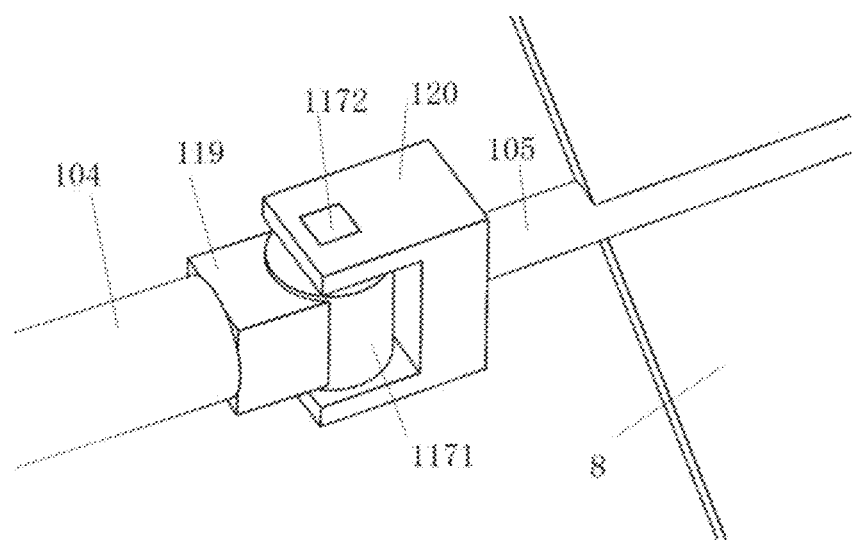
FIG. 43 is a schematic diagram of a leading multi-connecting-rod structure of a wing structure with two multi-connecting-rod structures according to an embodiment of the disclosure.

The fourth leading connecting rod 104 and the fifth leading connecting rod 105 are connected by the seventh leading motor 117, as described above. Specifically, as shown in FIGS. 42 and 43, the seventh leading motor 117 includes a seventh leading motor stator 1171 and a seventh leading motor rotor 1172, where the seventh leading motor rotor 1172 is located in the seventh leading motor stator 1171, a sixth leading connector 119 is provided at the second end of the fourth leading connecting rod 104, and the fourth leading connecting rod 104 is connected to the seventh leading motor stator 1171 by the sixth leading connector 119. Moreover, a seventh leading connector 120 is provided at the first end of the fifth leading connecting rod 105, and the seventh leading motor rotor 1172 is connected to the fifth leading connecting rod 105 by means of the seventh leading connector 120. For example, the seventh leading connector 120 is a U-shaped connector, and the seventh leading motor rotor 1172 is rotatably connected to the two sides of the seventh leading connector 120, the bottom edge of the seventh leading connector 120 is connected to the first end of the fifth leading connecting rod 105, and the second end of the fifth leading connecting rod 105 is connected to the leading end rib 8.

Figure 44:
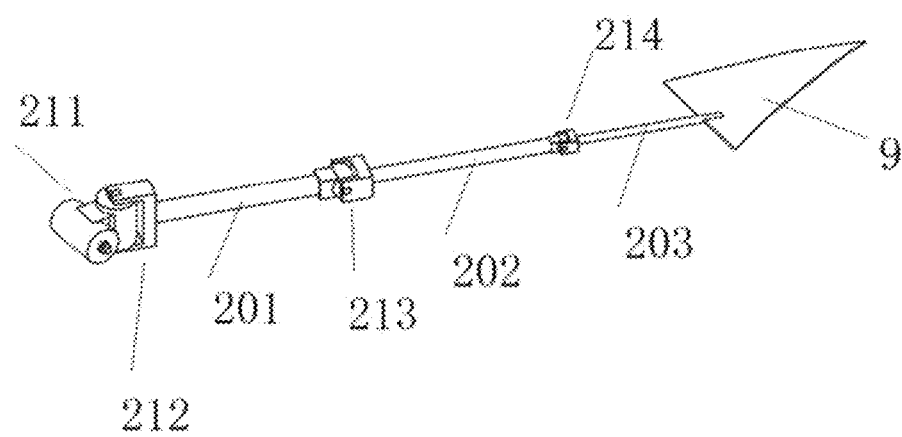
FIG. 44 is a schematic diagram of a middle multi-connecting-rod structure of a wing structure with two multi-connecting-rod structures according to an embodiment of the disclosure.

FIG. 44 shows the middle multi-connecting-rod structure located in the middle of the wing, which includes a first middle connecting rod 201, a second middle connecting rod 202 and a third middle connecting rod 203 that are connected in sequence, in which the first middle connecting rod 201 is connected to the support connecting rod 10, and the third middle connecting rod 203 is connected to the middle end rib 9.

In order to enable the middle multi-connecting-rod structure in the middle of the wings to swing with multiple degrees of freedom, the middle connecting rod and the support connecting rod are connected by a motor and the adjacent middle connecting rods are connected by a motor. Specifically, the first middle connecting rod 101 is connected to the support connecting rod 10 by the first middle motor 211 and the second middle motor 212, the first middle connecting rod 201 and the second middle connecting rod 202 are connected by the third middle motor 213, and the second middle connecting rod 202 is connected to the third middle connecting rod 203 by the fourth middle motor 214. The first middle motor 211 is an outer-rotor motor, and the second middle motor 212, the third middle motor 213 and the fourth middle motor 214 are inner-rotor motors.

It should be noted that, in the embodiment of the present disclosure, the number of the connecting rods and the arrangement of the motors between the connecting rods can be adjusted and set according to the actual situation, and are not limited to the arrangement in the embodiment.

Figure 45:
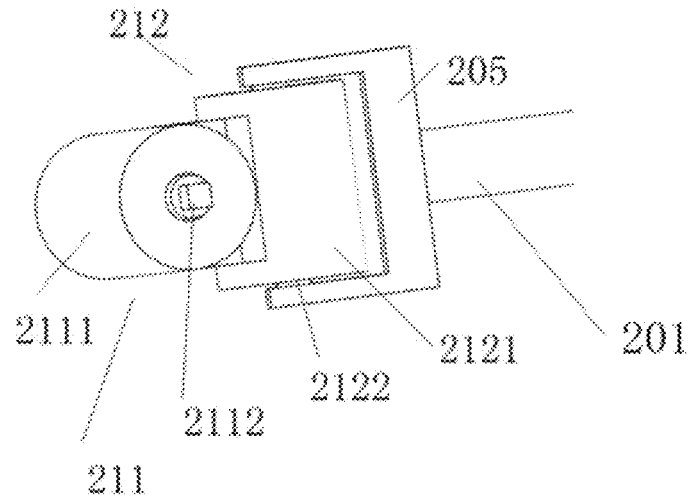
FIG. 45 is a schematic diagram of a middle multi-connecting-rod structure of a wing structure with two multi-connecting-rod structures according to an embodiment of the disclosure.
Figure 46:
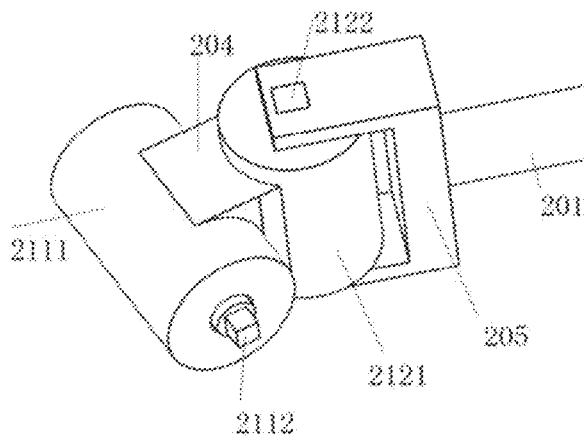
FIG. 46 is a schematic diagram of a middle multi-connecting-rod structure of a wing structure with two multi-connecting-rod structures according to an embodiment of the disclosure.

Further, as described above, the first middle connecting rod 201 and the support connecting rod 10 are connected by the first middle motor 211 and the second middle motor 212, and the first middle motor 211 and the second middle motor 212 cooperate with each other to enable the wings structure to achieve the ability to swing vertically along the plane where the main body of the vehicle is located, and to enable the wing structure to achieve the ability to swing longitudinally along the main body of the vehicle at the same time. Specifically, as shown in FIG. 45 and FIG. 46, the first middle motor 211 includes a middle motor rotor 2111 and a first middle motor stator 2112, the second middle motor 212 includes a second middle motor stator 2121 and a second middle motor rotor 2122, in which the first middle motor stator 2112 is located in the first middle motor rotor 2111, the second middle motor rotor 2122 is located in the second middle motor stator 2121, and the first middle motor stator 2112 is connected to the support connecting rod 10, so that the first middle motor stator 2112 and the support connecting rod 10 are coaxially arranged. Moreover, the first middle motor rotor 2111 is connected to the second middle motor stator 2121 by the first middle connector 204 so that the directions of the first middle motor stator 2112 and the second middle motor rotor 2122 are perpendicular to each other. The second middle connector 205 is disposed at the first end of the first middle connecting rod 201, and the second middle motor stator 2121 is connected to the first middle connecting rod 101 by means of the second middle connector 205. For example, the first middle connector 204 and the second middle connector 205 are U-shaped connectors, the first middle motor rotor 2111 is fixedly arranged between the two sides of the first middle connector 204, the bottom edge of the first middle connector 204 is connected to the side surface of the second middle motor stator 2121, the second middle motor rotor 2122 is connected to the two sides of the second middle connector 205, and the bottom edge of the second middle connector 205 is connected to the first end of the first middle connecting rod 201.

Figure 47:
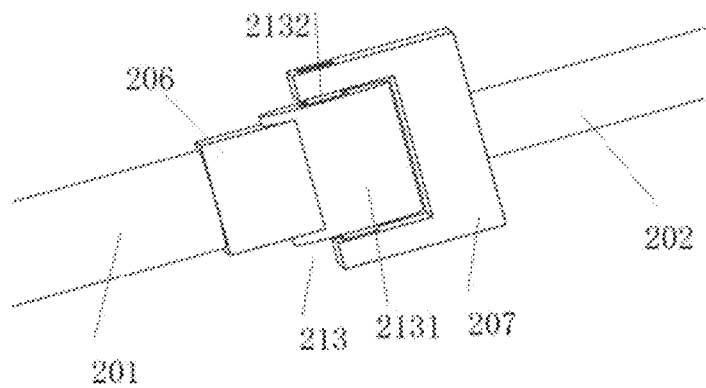
FIG. 47 is a schematic diagram of a middle multi-connecting-rod structure of a wing structure with two multi-connecting-rod structures according to an embodiment of the disclosure.
Figure 48:
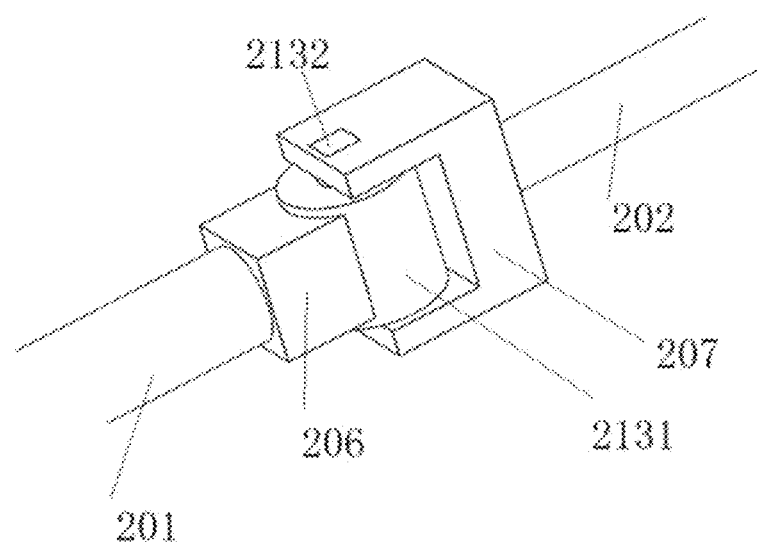
FIG. 48 is a schematic diagram of a middle multi-connecting-rod structure of a wing structure with two multi-connecting-rod structures according to an embodiment of the disclosure.

The first middle connecting rod 201 and the second middle connecting rod 202 are connected by the third middle motor 213, as described above. Specifically, as shown in FIGS. 47 and 48, the third middle motor 213 includes a third middle motor stator 2131 and the third middle motor rotor 2132, in which the third middle motor rotor 2132 is located in the third middle motor stator 2131, a third middle connector 206 is provided at the second end of the first middle connecting rod 201, and the first middle connecting rod 201 is connected to the third middle motor stator 2131 by means of the third middle connector 206. Moreover, a fourth middle connector 207 is provided at the first end of the second middle connecting rod 202, and the third middle motor rotor 2132 is connected to the second middle connecting rod 202 by means of the fourth middle connector 207. For example, the fourth middle connector 207 is a U-shaped connector, the third middle motor rotor 2132 is rotatably connected to the two sides of the fourth middle connector 207, and the bottom edge of the fourth middle connector 207 is connected to the first end of the second middle connecting rod 202.

Figure 49:
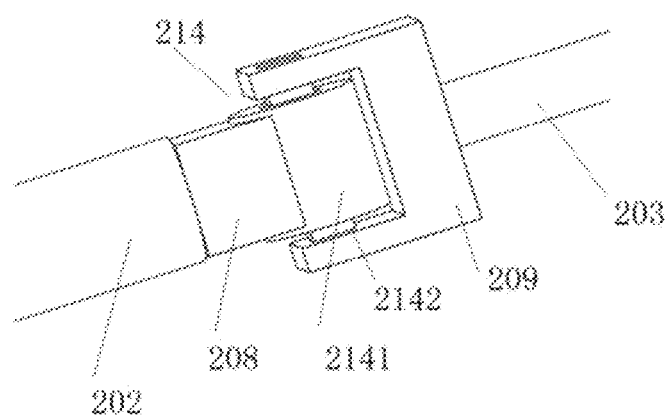
FIG. 49 is a schematic diagram of a middle multi-connecting-rod structure of a wing structure with two multi-connecting-rod structures according to an embodiment of the disclosure.
Figure 50:
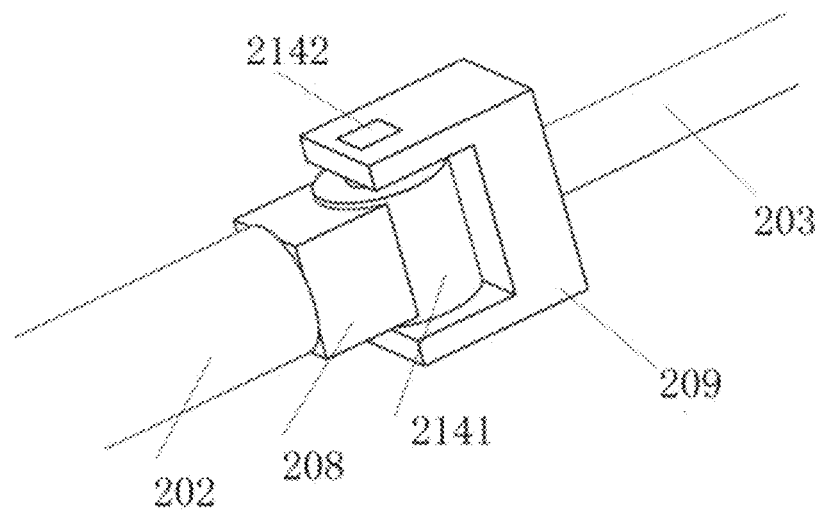
FIG. 50 is a schematic diagram of a middle multi-connecting-rod structure of a wing structure with two multi-connecting-rod structures according to an embodiment of the disclosure.

The second middle connecting rod 202 and the third middle connecting rod 203 are connected by the fourth middle motor 214, as described above. Specifically, as shown in FIGS. 49 and 50, the fourth middle motor 214 includes a fourth middle motor stator 2141 and a fourth middle motor rotor 2142, in which the fourth middle motor rotor 2142 is located in the fourth middle motor stator 2141, a fifth middle connector 208 is provided at the second end of the second middle connecting rod 202, and the second middle connecting rod 202 is connected to the fourth middle motor stator 2141 by means of the fifth middle connector 208. Moreover, the sixth middle connector 209 is provided at the first end of the third middle connecting rod 203, and the fourth middle motor rotor 2142 is connected to the third middle connecting rod 203 by means of the sixth middle connector 209. For example, the sixth middle connector 209 is a U-shaped connector, the fourth middle motor rotor 2142 is rotatably connected to the two sides of the sixth middle connector 209, the bottom edge of the sixth middle connector 209 is connected to the first end of the third middle connecting rod 203, and the second end of the third middle connecting rod 203 is connected to the middle end rib 9.

Figure 51:
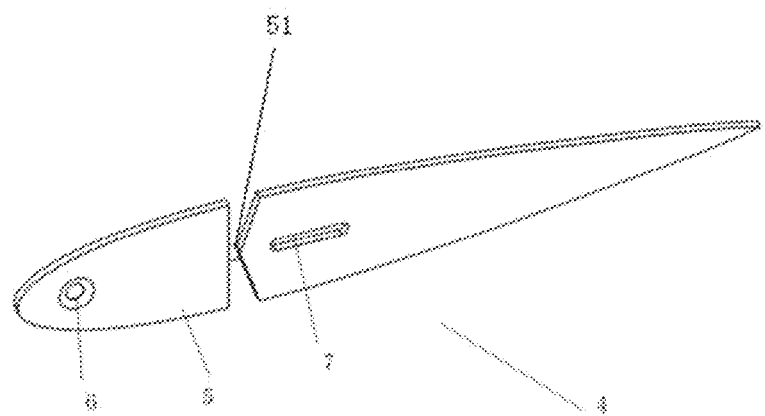
FIG. 51 is a schematic structural diagram of a wing in a wing structure with two multi-connecting-rod structures according to an embodiment of the disclosure.

With reference to FIGS. 31-33, multiple groups of ribs 4 are sleeved between the leading multi-connecting-rod structure 1 and the middle multi-connecting-rod structure 2, and as shown in FIG. 51, each group of ribs includes at least one rib unit 5, the adjacent rib units 5 are connected by ball hinging, for example, by a ball hinge 51, so that the adjacent rib units 5 can rotate relative to each other. Each rib unit 5 is sleeved onto the corresponding connecting rod mechanism, and the number of the rib units 5 is adjusted according to the wing width. For example, at the position close to the support connecting rod 10 of the main body of the vehicle and at the position in the middle of the wing structure, the rib units 5 are sleeved to the leading multi-connecting-rod structure 1 and the middle multi-connecting-rod structure 2, and the rib units 5 may be sleeved only to the leading multi-connecting-rod structure 1 at the position close to the wingtip. Further, the front end and the rear end of the rib unit 5 sleeved to the same multi-connecting-rod structure are connected by a fixing part 52, and the fixing part 52 herein can be elastic fiber wire or metal wire, so as to ensure that the rib unit 5 sleeved to the same multi-connecting-rod structure can swing synchronously by means of the corresponding multi-connecting-rod structure to enable the pitching motion of the wing structure.

Figure 52:
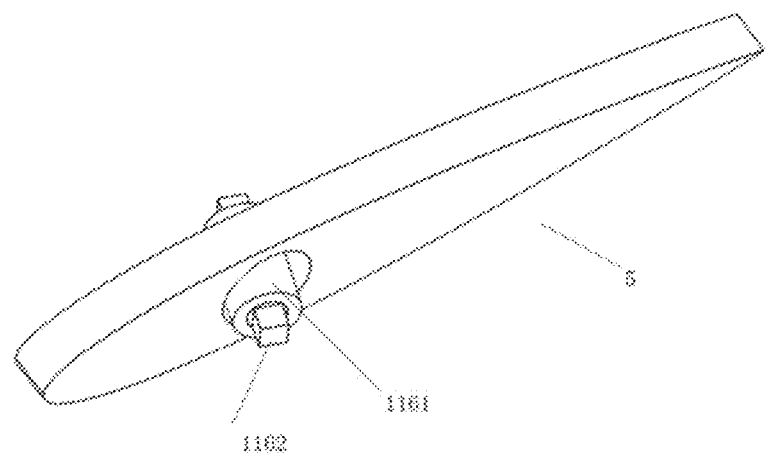
FIG. 52 is a schematic structural diagram of a rib unit in a rib of a wing structure with two multi-connecting-rod structures according to an embodiment of the present disclosure.

In one embodiment, a conical hole 6 is provided on the rib unit 5 sleeved with the leading multi-connecting-rod structure 1 to facilitate the swinging of different connecting rod mechanisms. Therefore, the rib units 5 sleeved with the leading multi-connecting-rod structure 1 can swing up, down, left and right as passive ribs, and such a rib unit 5 can swing freely with the swinging of the connecting rod mechanism. A chute 7 is provided on the rib units 5 sleeved with the middle multi-connecting-rod structure 2, and thus the distance between the multi-connecting-rod structures can be adjusted to a certain extent. As a result, for example, the leading multi-connecting-rod structure 1 and the middle multi-connecting-rod structure 2 can achieve asynchronous swinging to realize the function of controlling the variable pitch angle of the wing structure. Of course, in another embodiment, the rib units 5 sleeved with the leading multi-connecting-rod structure 1 have different structures, and the rib units 5 as active-drive ribs can be sleeved onto the motor on the connecting rod mechanism so as to be driven based on the motion of the motor. For example, as shown in FIG. 52, the active-drive ribs can generally be set at a position of the wing structure close to the wingtip. The rib units 5 can be sleeved onto the outer side of the sixth leading motor rotor 1161 of the sixth leading motor 116, and two protrusions are provided on the surface of the sixth leading motor rotor 1161 to play a limiting role. The rib unit 5 can be sleeved between the two protrusions and restricted to move between the two protrusions. Thus, the position of the rib unit 5 is relatively fixed on the outside of the sixth leading motor rotor 1161 without sliding in the direction toward the skeleton of the main body of the vehicle or the direction towards the wingtip. It should be noted that the sizes of the rib units 5 sleeved onto different connecting rod structures are adjusted depending on the airfoil.

Figure 53:
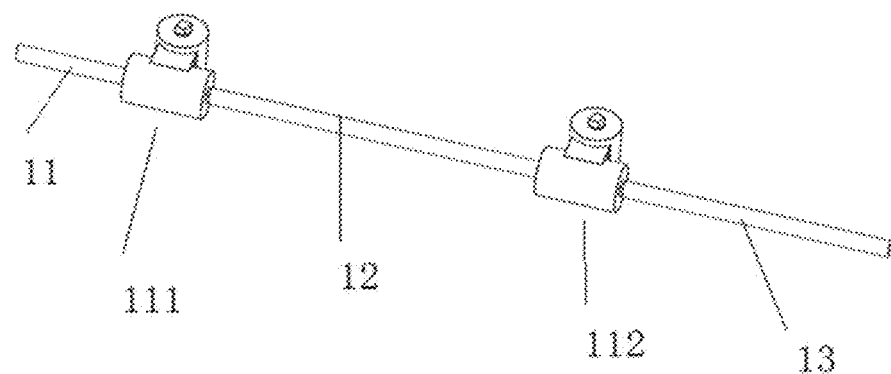
FIG. 53 is a schematic diagram of the connection between a connecting rod mechanism and a support structure of a wing structure with two multi-connecting-rod structures according to an embodiment of the disclosure.
Figure 54:
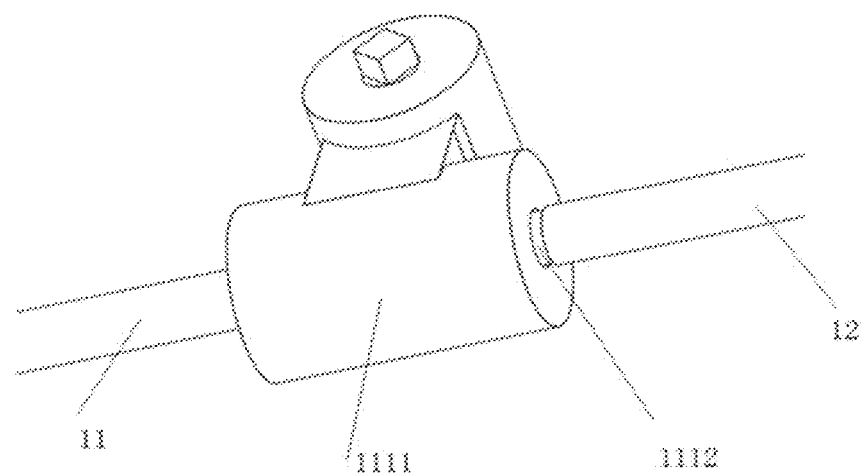
FIG. 54 is a schematic diagram of the connection between a connecting rod mechanism and a support structure of a wing structure with two multi-connecting-rod structures according to an embodiment of the disclosure.
Figure 55:
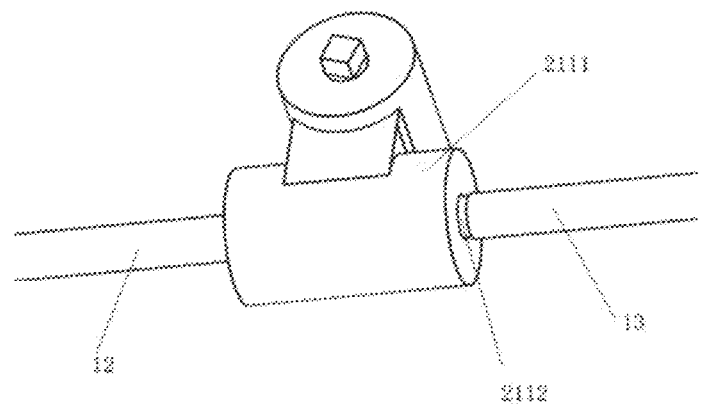
FIG. 55 is a schematic diagram of the connection between a connecting rod mechanism and a support structure of a wing structure with two multi-connecting-rod structures according to an embodiment of the disclosure.

Further, given that the first leading connecting rod 101 and the support connecting rod 10 are connected by the first leading motor 111 and the second leading motor 112, the first middle connecting rod 101 and the support connecting rod 10 are connected by the first middle motor 211 and the second middle motor 212. As shown in FIGS. 53-55, the support connecting rod 10 includes a first segment 11, a second segment 12 and a third segment 13, where the first segment 11 and the second segment 12 are coaxially connected to the two ends of first leading motor stator 1112 of the first leading motor 111 respectively, and the second segment 12 and the third segment 13 are coaxially connected to the two ends of the first middle motor stator 2112 of the first middle motor 211 respectively.

With the wing structure of this embodiment, when the first leading motor 111, the third leading motor 113, the fifth leading motor 115 and the seventh leading motor 117 are caused to rotate, the corresponding middle motors rotate in the same direction so that the corresponding connecting rod swings up and down to enable the wing structure to swing up and down accordingly. When the second leading motor 112 and the second middle motor 212 are caused to swing synchronously, the wing structure is enabled to swing back and forth. Moreover, when the fourth leading motor 114 is caused to rotate, the end portions of the wing structure are caused to twist.

Embodiments of the present disclosure provide wing structures that feature a morphing wing having a large range in both chordwise and spanwise directions. The wing structure is designed with the capability of changing airfoil and changing a pitch angle within a large range, the capability of twisting along a spanwise direction at a distal portion, the capability of swinging perpendicularly within a large range along the plane in which the main body of the vehicle is located, and the capability of swinging longitudinally within a large range along the main body of the vehicle. Adjustment can be made for a complex flow field or environment, the motion speed and the motion efficiency are significantly improved, and high maneuvering actions can be achieved.

In the following third embodiment, the implementation of the wing structure by means of a multi-connecting-rod structure is described in detail.

Figure 56:
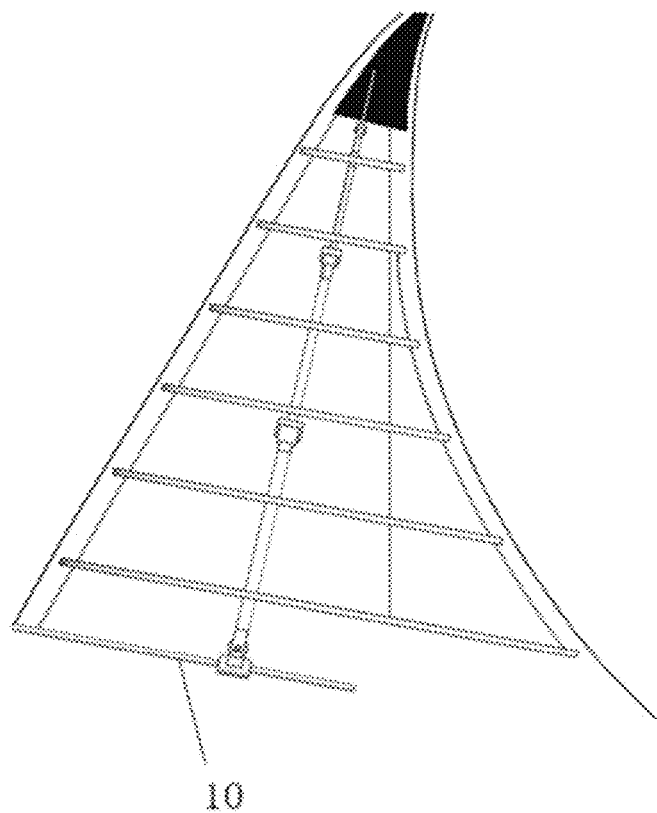
FIG. 56 is a schematic diagram of a leading multi-connecting-rod structure of a wing structure with a multi-connecting-rod structure according to an embodiment of the disclosure.
Figure 57:
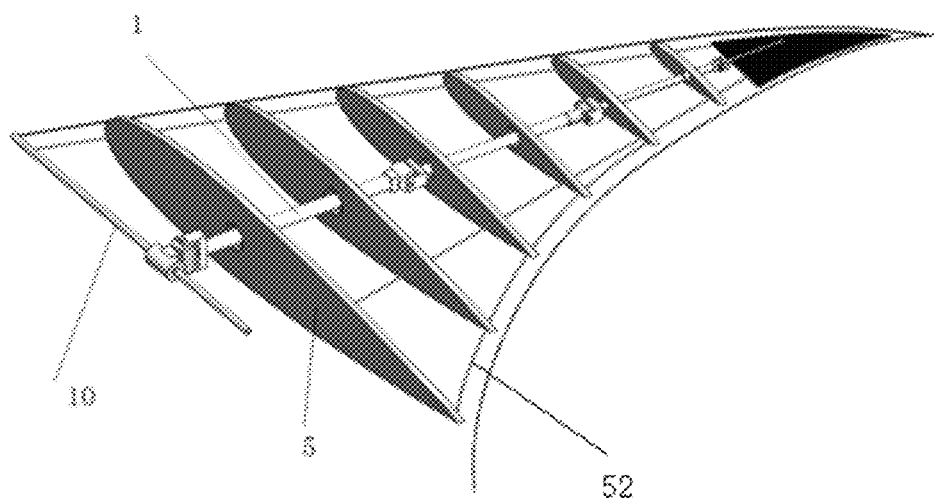
FIG. 57 is a schematic structural diagram of a wing structure with a multi-connecting-rod structure according to an embodiment of the disclosure.
Figure 58:
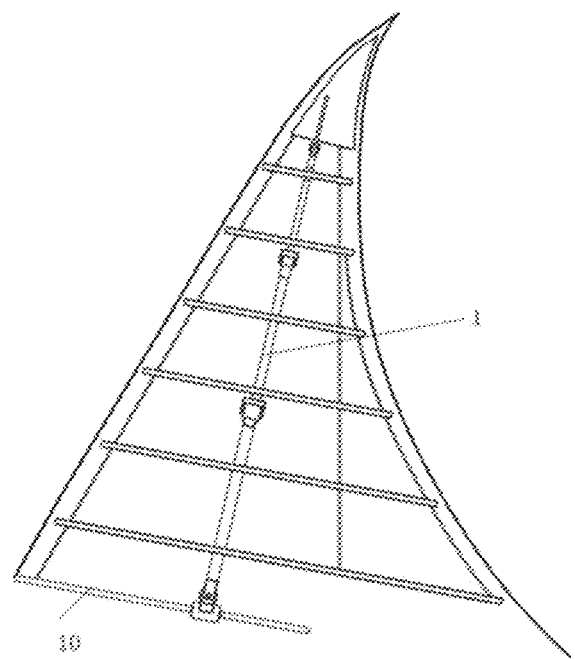
FIG. 58 is a schematic structural diagram of a wing structure with a multi-connecting-rod structure according to an embodiment of the disclosure.

FIGS. 56, 57 and 58 show the schematic structural diagrams of the wing structure with a multi-connecting-rod structure respectively. In this wing structure, a multi-connecting-rod structure is arranged at the leading edge of the wing in a direction extending from the main body of the vehicle to the wingtip. The multi-connecting-rod structure may be the leading multi-connecting-rod structure 1. The first end of this multi-connecting-rod structure is connected to the support connecting rod 10 located on the main body of the vehicle, and the direction of the support connecting rod 10 is consistent with the depth direction of the main body of the vehicle. The above-mentioned multi-connecting-rod structure performs independent movement according to the control commands, so as to better simulate the movement of the creature. The multi-connecting-rod structure as mentioned above is sleeved with ribs, and the ribs are composed of rib units, where the rib units can be usually made of rigid material. Preferably, the rib units near the tail of the vehicle can be entirely made of flexible material, or made of half rigid and half flexible material, so that the rib units located near the tail of the vehicle are enabled to passively deform flexibly. The wing structure in the embodiment of the present disclosure has the characteristics of a morphing wing in a large range in both the chordwise and spanwise directions, and has the capability of variable airfoil and wide range of pitch angles, the capability of twisting the distal portion of the wing structure away from the main body of the vehicle in the spanwise direction, the capability to swing vertically in a large range along the plane where the main body of the vehicle is located, and the capability to swing longitudinally in a large range along the main body of the vehicle.

Figure 59:
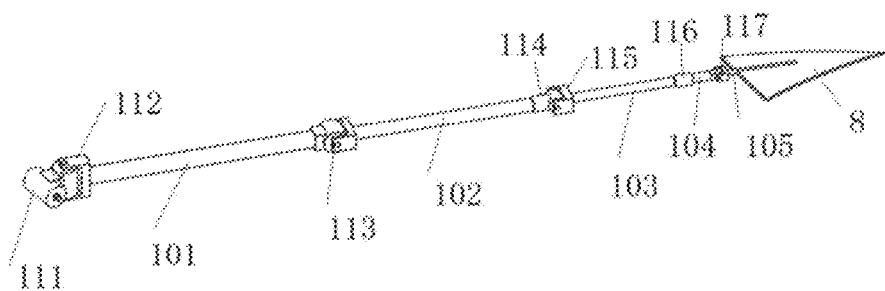
FIG. 59 is a schematic diagram of a leading multi-connecting-rod structure of a wing structure with a multi-connecting-rod structure according to an embodiment of the disclosure.

FIG. 59 shows the leading multi-connecting-rod structure located at the leading edge of the wing, which includes a first leading connecting rod 101, a second leading connecting rod 102, a third leading connecting rod 103, and a fourth leading connecting rod 104 and the fifth leading connecting rod 105 that are connected in sequence, in which the first leading connecting rod 101 is connected to the support connecting rod 10, and the fifth leading connecting rod 105 is connected with the leading end rib 8.

In order to enable the leading multi-connecting-rod structure at the leading edge of the wing to swing with multiple degrees of freedom, the leading connecting rod and the support connecting rod are connected by a motor, and the adjacent leading connecting rods are connected by a motor. Specifically, the first leading connecting rod 101 and the support connecting rod 10 are connected by the first leading motor 111 and the second leading motor 112, the first leading connecting rod 101 and the second leading connecting rod 102 are connected by the third leading motor 113, the second leading connecting rod 102 and the third leading connecting rod 103 are connected by the fourth leading motor 114 and the fifth leading motor 115, the third leading connecting rod 103 and the fourth leading connecting rods 104 are connected by a sixth leading motor 116, and the fourth leading connecting rod 104 and the fifth leading connecting rod 105 are connected by a seventh leading motor 117. The first leading motor 111 and the sixth leading motor 116 are outer-rotor motors, and the second leading motor 112, the third leading motor 113, the fourth leading motor 114, the fifth leading motor 115 and the seventh leading motor 117 are inner-rotor motors.

It should be noted that, in the embodiment of the present disclosure, the number of the connecting rods and the arrangement of the motors between the connecting rods can be adjusted and set according to the actual situations, and are not limited to the arrangement in the embodiment.

Figure 60:
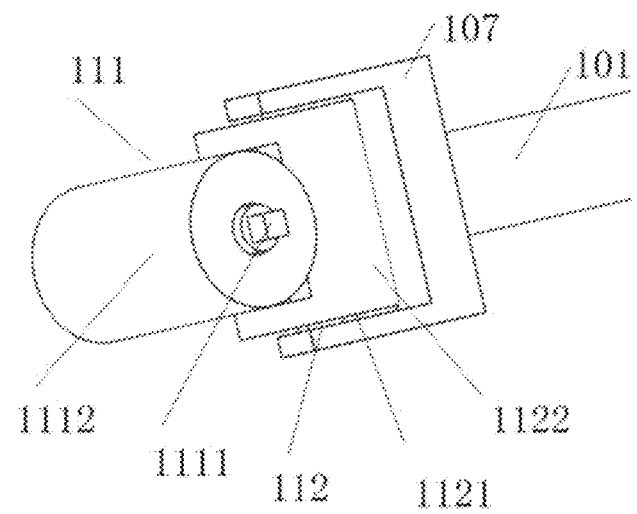
FIG. 60 is a schematic diagram of a leading multi-connecting-rod structure of a wing structure with a multi-connecting-rod structure according to an embodiment of the disclosure.
Figure 61:
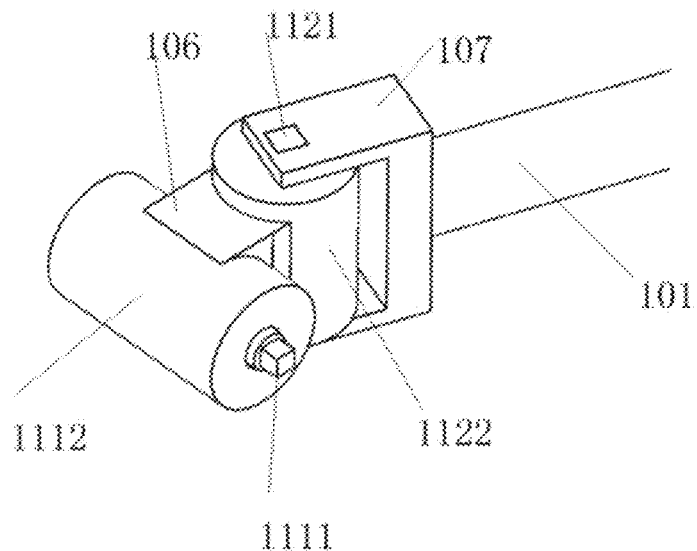
FIG. 61 is a schematic diagram of a leading multi-connecting-rod structure of a wing structure with a multi-connecting-rod structure according to an embodiment of the disclosure.

Further, as described above, the first leading connecting rod 101 and the support connecting rod 10 are connected by the first leading motor 111 and the second leading motor 112, and the first leading motor 111 and the second leading motor 112 cooperate with each other to enable the wing structure to swing vertically along the plane where the main body of the vehicle is located, and to enable the wing structure to swing longitudinally along the main body of the vehicle at the same time. Specifically, as shown in FIGS. 60 and 61, the first leading motor 111 includes a first leading motor rotor 1111 and a first leading motor stator 1112, and the second leading motor 112 includes a second leading motor stator 1121 and a second leading motor rotor 1122, in which the first leading motor 1112 is located in the first leading motor rotor 1111, the second leading motor rotor 1122 is located in the second leading motor stator 1121, and the first leading motor stator 1112 is connected to the support connecting rod 10, so that the first leading motor stator 1112 and the support connecting rod 10 are coaxially arranged. The first leading motor rotor 1111 is connected to the second leading motor stator 1121 by means of the first leading connector 106 so that the directions of the first leading motor stator 1112 and the second leading motor rotor 1122 are perpendicular to each other. A second leading connector 107 is provided at the first end of the first leading connecting rod 101, and the second leading motor stator 1121 is connected to the first leading connecting rod 101 by means of the second leading connector 107. For example, the first leading connector 106 and the second leading connector 107 may be U-shaped connectors, and the first leading motor rotor 1111 is fixedly arranged between the two sides of the first leading connector 106, the bottom edge of the first leading connector 106 is connected to the side surface of the second leading motor stator 1121, the second leading motor rotor 1122 is rotatably connected to the two sides of the second leading connector 107, and the bottom edge of the second leading connector 107 is connected to the first end of the first leading connecting rod 101.

Figure 62:
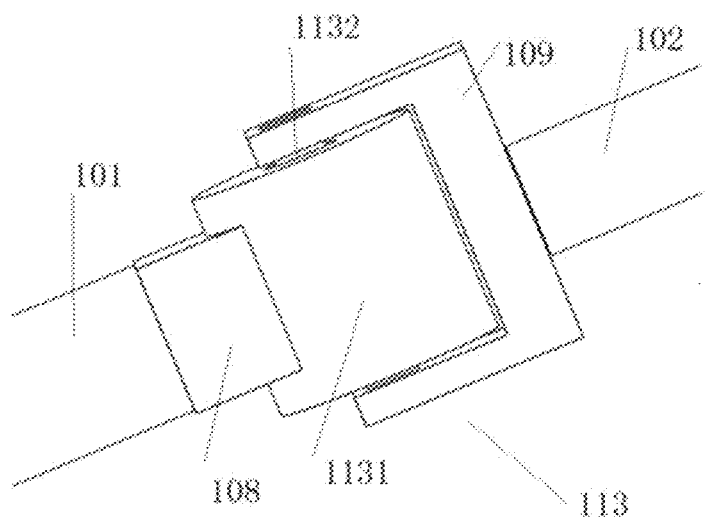
FIG. 62 is a schematic diagram of a leading multi-connecting-rod structure of a wing structure with a multi-connecting-rod structure according to an embodiment of the disclosure.
Figure 63:
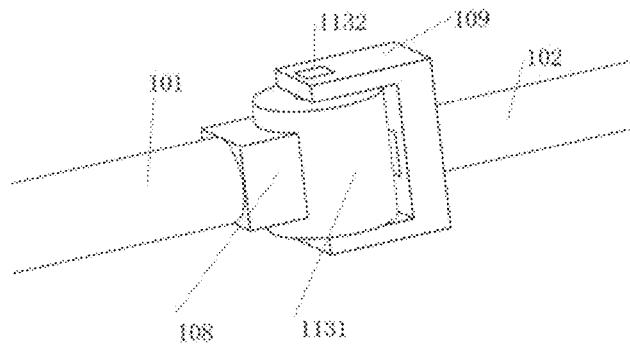
FIG. 63 is a schematic diagram of a leading multi-connecting-rod structure of a wing structure with a multi-connecting-rod structure according to an embodiment of the disclosure.

As described above, the first leading connecting rod 101 and the second leading connecting rod 102 are connected by the third leading motor 113. Specifically, as shown in FIGS. 62 and 63, the third leading motor 113 includes a first leading motor stator 1131 and a third leading motor rotor 1132, in which the third leading motor rotor 1132 is located in the third leading motor stator 1131, a third leading connector 108 is provided at the second end of the first leading connecting rod 101, the first leading connecting rod 101 is connected to the third leading motor stator 1131 by means of the third leading connector 108, a fourth leading connector 109 is provided at the first end of the second leading connecting rod 102, and the third leading motor rotor 1132 is connected to the second leading connecting rod 102 by means of the fourth leading connector 109. For example, the fourth leading connector 109 is a U-shaped connector, and the third leading motor rotor 1132 is rotatably connected to the two sides of the fourth leading connector 109, and the bottom edge of the fourth leading connector 109 is connected with the first end of the second leading connecting rod 102.

Figure 64:
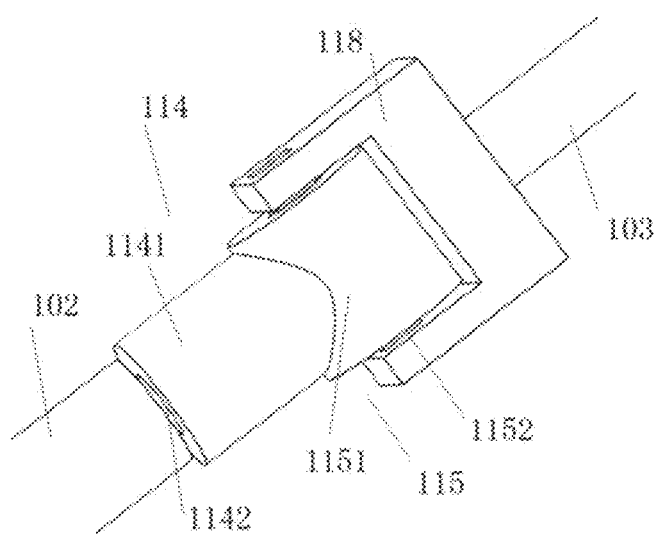
FIG. 64 is a schematic diagram of a leading multi-connecting-rod structure of a wing structure with a multi-connecting-rod structure according to an embodiment of the disclosure.
Figure 65:
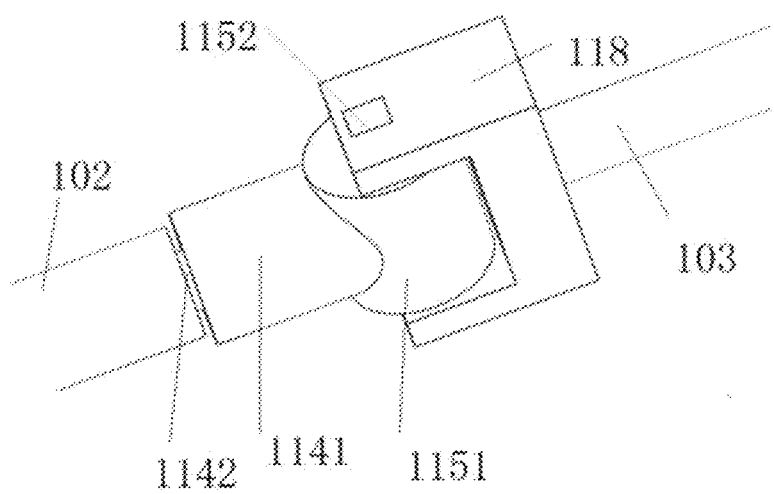
FIG. 65 is a schematic diagram of a leading multi-connecting-rod structure of a wing structure with a multi-connecting-rod structure according to an embodiment of the disclosure.

As described above, the second leading connecting rod 102 and the third leading connecting rod 103 are connected by the fourth leading motor 114 and the fifth leading motor 115. The fourth leading motor 114 and the fifth leading motor 115 cooperate with each other so that the distal portion of the wing structure away from the main body of the vehicle can swing vertically along the plane of the wing body near the trunk end of the wing, and the distal portion of the wing structure away from the main body of the vehicle can twist and swing in the spanwise direction. Specifically, as shown in FIGS. 64 and 65, the fourth leading motor 114 includes a fourth leading motor stator 1141 and a fourth leading motor rotor 1142, and the fifth leading motor 115 includes a fifth leading motor stator 1151 and a fifth leading motor rotor 1152, in which the fourth leading motor rotor 1142 is located in the fourth leading motor stator 1141, the fifth leading motor rotor 1152 is located in the fifth leading motor stator 1151, the second leading connecting rod 102 is coaxially connected to the fourth leading motor rotor 1142, the fourth leading motor stator 1141 and the fifth leading motor stator 1151 are vertically connected to each other, and a fifth leading connector 118 is provided at the first end of the third leading connecting rod 103, and the fifth leading motor rotor 1152 are connected to the third leading connecting rod 103 by means of the fifth leading connector 118. Thus, the fifth leading motor 115 can enable the wing structure to twist in the spanwise direction. For example, the fifth leading connector 118 is a U-shaped connector, the fifth leading motor rotor 1152 is rotatably connected to the two sides of the fifth leading connector 118, and the bottom edge of the fifth leading connector 110 is connected to the first end of the third leading connecting rod 103.

Figure 66:
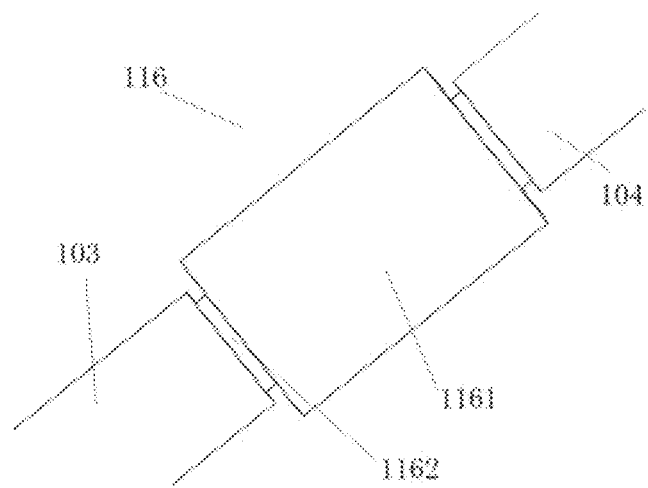
FIG. 66 is a schematic diagram of a leading multi-connecting-rod structure of a wing structure with a multi-connecting-rod structure according to an embodiment of the disclosure.

As mentioned above, the third leading connecting rod 103 and the fourth leading connecting rod 104 are connected by the sixth leading motor 116, where the sixth leading motor 116 can enable the distal portion of the wing structure to conduct a pitching motion. Specifically, as shown in FIG. 66, the sixth leading motor 116 includes a sixth leading motor rotor 1161 and a sixth leading motor stator 1162, where the sixth leading motor stator 1162 is located in the sixth leading motor rotor 1161, the third leading connecting rod 103 is coaxially connected to the first end of the sixth leading motor stator 1162, and the second end of the sixth leading motor stator 1162 is coaxially connected to the fourth leading connecting rod 104.

Figure 67:
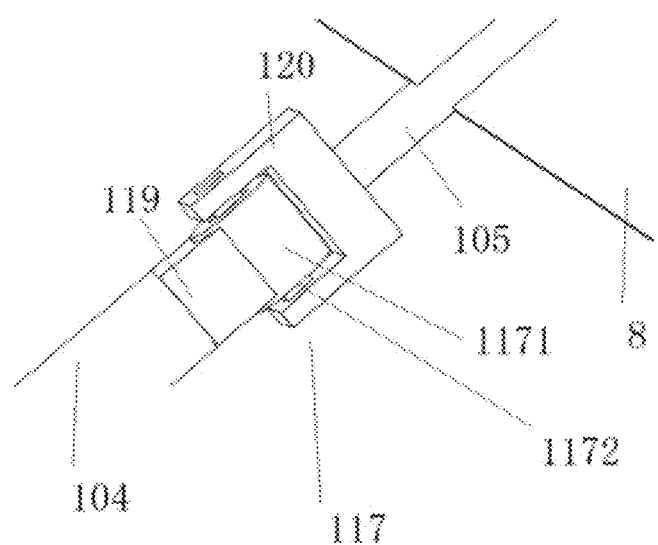
FIG. 67 is a schematic diagram of a leading multi-connecting-rod structure of a wing structure with a multi-connecting-rod structure according to an embodiment of the disclosure.
Figure 68:
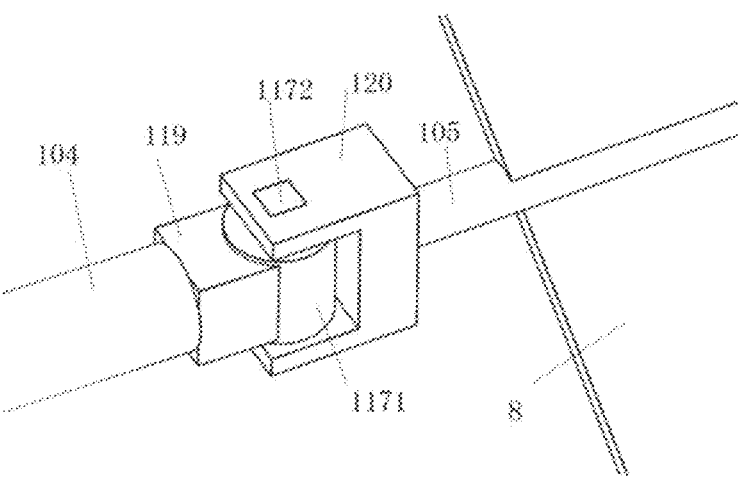
FIG. 68 is a schematic diagram of a leading multi-connecting-rod structure of a wing structure with a multi-connecting-rod structure according to an embodiment of the disclosure.

As described above, the fourth leading connecting rod 104 and the fifth leading connecting rod 105 are connected by the seventh leading motor 117. Specifically, as shown in FIGS. 67 and 68, the seventh leading motor 117 includes a seventh leading motor stator 1171 and a seventh leading motor rotor 1172, in which the seventh leading motor rotor 1172 is located in the seventh leading motor stator 1171, a sixth leading connector 119 is provided at the second end of the fourth leading connecting rod 104, the fourth leading connecting rod 104 is connected to the seventh leading motor stator 1171 by means of the sixth leading connector 119, a seventh leading connector 120 is provided at the first end of the fifth leading connecting rod 105, and the seventh leading motor rotor 1172 is connected to the fifth leading connecting rod 105 by means of the seventh leading connector 120. For example, the seventh leading connector 120 is a U-shaped connector, and the seventh leading motor rotor 1172 is rotatably connected to the two sides of the seventh leading connector 120, the bottom edge of the seventh leading connector 120 is connected to the first end of the fifth leading connecting rod 105, and the second end of the fifth leading connecting rod 105 is connected to the leading end rib 8.

With reference to FIGS. 56-58, multiple groups of ribs 4 are sleeved onto the leading multi-connecting-rod structure 1. As shown in FIG. 57, each group of ribs 4 includes a rib unit 5, and the number of rib units 5 is adjusted based on wing width. Further, the front end and the rear end of the rib unit 5 sleeved on the leading multi-connecting-rod structure 1 are connected by a fixing part 52, and the fixing part 52 herein may be elastic fiber wire or metal wire to ensure that the rib units 5 sleeved on the same multi-connecting-rod structure can swing synchronously based on the corresponding multi-connecting-rod structure, to thereby realize the pitching motion of the wing structure.

Figure 69:
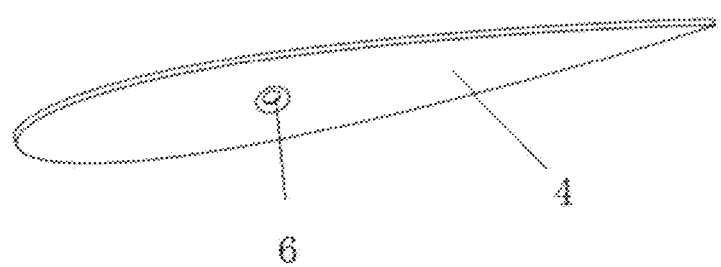
FIG. 69 is a schematic structural diagram of a rib in a wing structure with a multi-connecting-rod structure according to an embodiment of the disclosure.
Figure 70:
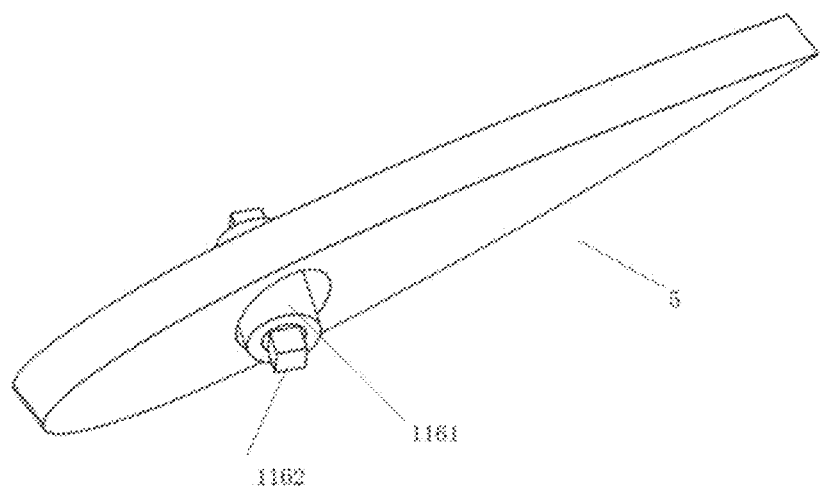
FIG. 70 is a schematic structural diagram of a rib unit in a rib of a wing structure with a multi-connecting-rod structure according to an embodiment of the disclosure.

In one embodiment, as shown in FIG. 69, a conical hole 6 is provided on the rib unit 5 sleeved with the leading multi-connecting-rod structure 1 to facilitate the swinging of different connecting rod mechanisms. The rib units 5 sleeved with the leading multi-connecting-rod structure 1 can swing up, down, left and right as passive ribs, and such rib units 5 can swing freely with the swinging of the connecting rod mechanism. Of course, in another embodiment, the rib units 5 sleeved with the leading multi-connecting-rod structure 1 have different structures. The rib unit 5 can be sleeved to the motor on the connecting rod mechanism as active-drive ribs, so as to realize the driving based on the movement of the motor. For example, as shown in FIG. 70, the active-drive ribs can generally be arranged at the wingtips of the wing structure, and the rib units 5 may be sleeved on the outer side of the sixth leading motor rotor 1161 of the sixth leading motor 116. Two protrusions are provided on the surface of the six leading motor rotor 1161 to play a limiting role, and the rib units 5 may be sleeved between the two protrusions and restricted to move between the two protrusions. Thus, the position of the rib units 5 is relatively fixed on the outer side of the sixth leading motor rotor 1161 without sliding in the direction toward the skeleton of the main body of the vehicle or the direction towards the wingtip. It should be noted that the sizes of the rib units 5 sleeved onto different connecting rod structures are adjusted depending on the airfoil.

Figure 71:
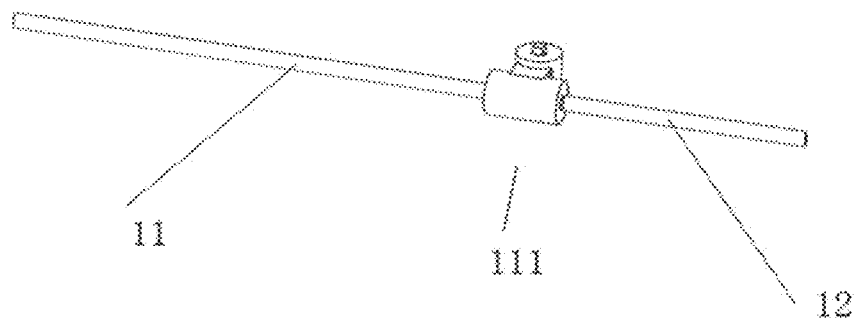
FIG. 71 is a schematic diagram of the connection between a connecting rod mechanism and a support structure of a wing structure with a multi-connecting-rod structure according to an embodiment of the disclosure.
Figure 72:
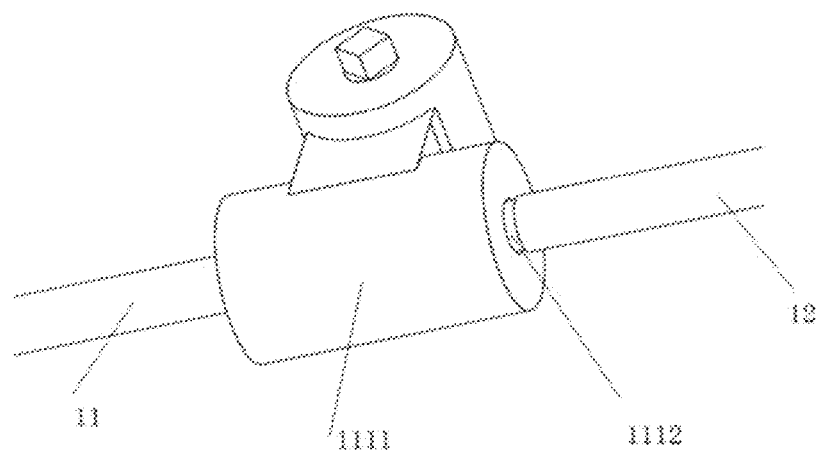
FIG. 72 is a schematic diagram of the connection between a connecting rod mechanism and a support structure of a wing structure with a multi-connecting-rod structure according to an embodiment of the disclosure.

Further, given that the first leading connecting rod 101 and the support connecting rod 10 are connected by the first leading motor 111 and the second leading motor 112, as shown in FIGS. 71 and 72, the support connecting rod 10 includes a first segment 11 and second segment 12, where both ends of the first leading motor stator 1112 of the first leading motor 111 are coaxially connected to the first segment 11 and the second segment 12, respectively.

With the wing structure of this embodiment, when the first leading motor 111, the third leading motor 113, the fifth leading motor 115 and the seventh leading motor 117 are caused to rotate, the corresponding connecting rods swing up and down, thereby enabling the wing structure to swings up and down. When the fourth leading motor 114 and the sixth leading motor 116 are caused to swing synchronously, the pitch motion of the wing structure is enabled. When the fourth leading motor 114 is caused to rotate, the end portion of the wing structure is twisted.

Embodiments of the present disclosure provide wing structures that feature a morphing wing having a large range in both chordwise and spanwise directions. The wing structure is designed with the capability of changing airfoil and changing a pitch angle within a large range, the capability of twisting along a spanwise direction at a distal portion, the capability of swinging perpendicularly within a large range along the plane in which the main body of the vehicle is located, and the capability of swinging longitudinally within a large range along the main body of the vehicle. Adjustment can be made for a complex flow field or environment, the motion speed and the motion efficiency are significantly improved, and high maneuvering actions can be achieved.

The above embodiments are only exemplary embodiments of the present disclosure, and are not intended to limit the present disclosure, and the protection scope of the present disclosure is defined by the claims. Those skilled in the art can make various modifications or equivalent replacements to the present disclosure within the spirit and protection scope of the present disclosure, and such modifications or equivalent replacements shall also be regarded as falling within the protection scope of the present disclosure.

What is claimed is:

1. A wing structure for a vehicle, comprising a plurality of multi-connecting-rod structures, the multi-connecting-rod structures are arranged along the main body of the vehicle, each of the multi-connecting-rod structure being arranged in a direction extending from a main body of the vehicle to a wingtip, each of the multi-connecting-rod structures comprising a plurality of connecting rods, and the connecting rods that are adjacent to each other being connected by a motor, a plurality of groups of ribs are sleeved onto each of the multi-connecting-rod structures, and each group of the ribs comprises a plurality of rib units, wherein in the same group of the ribs, adjacent rib units are connected by a ball hinge.

2. The wing structure according to claim 1, wherein the connecting rods and the motor are connected to each other to realize at least one of the following changes or movements of the wing structure:
    changes in an airfoil profile, changes in a pitch angle, twisting along a spanwise direction at a distal portion, and swinging longitudinally along the main body of the vehicle.

3. The wing structure according to claim 1, wherein the main body of the vehicle comprises a support connecting rod, the extension direction of the support connecting rod is consistent with a length direction of the main body of the vehicle, and a first end of the multi-connecting-rod structure is connected to the support connecting rod.

4. The wing structure according to claim 1, wherein a second end of the multi-connecting-rod structure is connected to an end rib.

5. The wing structure according to claim 1, wherein the lengths of the multi-connecting-rod structures arranged in sequence from a head to a tail of the main body of the vehicle decrease in sequence.

6. The wing structure according to claim 1, wherein the number of the rib units in each group of the ribs is less than or equal to the number of the multi-connecting-rod structures.

7. The wing structure according to claim 1, wherein front ends or rear ends of all the rib units sleeved on the same multi-connecting-rod structure are connected by a fixing part.

8. The wing structure according to claim 7, wherein the fixing part is an elastic fiber wire or a metal wire.

9. The wing structure according to claim 1, wherein a conical hole or a chute is arranged on the rib unit.

10. A vehicle comprising the wing structure of claim 1.

* * * * *